(12) United States Patent
Munaoka

(10) Patent No.: US 10,826,068 B2
(45) Date of Patent: Nov. 3, 2020

(54) NEGATIVE ELECTRODE, BATTERY, BATTERY PACK, ELECTRONIC APPARATUS, ELECTRICALLY DRIVEN VEHICLE, ELECTRICAL STORAGE DEVICE, AND ELECTRIC POWER SYSTEM

(71) Applicant: Murata Manufacturing Co., Ltd., Kyoto (JP)

(72) Inventor: Takatoshi Munaoka, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 35 days.

(21) Appl. No.: 15/566,353

(22) PCT Filed: Apr. 14, 2016

(86) PCT No.: PCT/JP2016/002014
§ 371 (c)(1),
(2) Date: Oct. 13, 2017

(87) PCT Pub. No.: WO2017/002288
PCT Pub. Date: Jan. 5, 2017

(65) Prior Publication Data
US 2018/0138511 A1 May 17, 2018

(30) Foreign Application Priority Data
Jun. 30, 2015 (JP) .................. 2015-130798

(51) Int. Cl.
*H01M 4/62* (2006.01)
*H01M 4/134* (2010.01)
(Continued)

(52) U.S. Cl.
CPC ......... *H01M 4/625* (2013.01); *H01M 2/1016* (2013.01); *H01M 4/133* (2013.01); *H01M 4/134* (2013.01); *H01M 4/364* (2013.01); *H01M 4/38* (2013.01); *H01M 4/386* (2013.01); *H01M 4/387* (2013.01); *H01M 4/483* (2013.01); *H01M 4/587* (2013.01); *B60L 53/00* (2019.02);
(Continued)

(58) Field of Classification Search
CPC ...................................... H01M 4/625
USPC ...................................... 429/231.8
See application file for complete search history.

(56) References Cited

U.S. PATENT DOCUMENTS

| 6,245,455 B1 | 6/2001 | Kohno et al. |
| 2008/0090149 A1 | 4/2008 | Sano et al. |

(Continued)

FOREIGN PATENT DOCUMENTS

| CN | 103430362 A | 12/2013 |
| CN | 104094453 A | 10/2014 |

(Continued)

OTHER PUBLICATIONS

Extended European Search Report of EP Patent Application No. 16817402.7, dated Nov. 2, 2018, 07 pages.

(Continued)

*Primary Examiner* — James M Erwin
(74) *Attorney, Agent, or Firm* — Chip Law Group

(57) ABSTRACT

Provided are a negative electrode, a battery, a battery pack, an electronic apparatus, an electrically driven vehicle, an electrical storage device, and an electric power system which are capable of improving cycle characteristics.

12 Claims, 7 Drawing Sheets

(51) Int. Cl.
*H01M 4/133* (2010.01)
*H01M 4/38* (2006.01)
*H01M 2/10* (2006.01)
*H01M 4/36* (2006.01)
*H01M 4/48* (2010.01)
*H01M 4/587* (2010.01)
*B60L 53/00* (2019.01)
*H01M 4/02* (2006.01)
*H02J 7/00* (2006.01)

(52) U.S. Cl.
CPC .. *H01M 2004/027* (2013.01); *H01M 2220/10* (2013.01); *H01M 2220/20* (2013.01); *H02J 7/0013* (2013.01)

(56) References Cited

U.S. PATENT DOCUMENTS

| | | | |
|---|---|---|---|
| 2011/0163274 A1 | 7/2011 | Plee et al. | |
| 2012/0214070 A1 | 8/2012 | Yamamoto et al. | |
| 2014/0356695 A1 | 12/2014 | Abe et al. | |
| 2015/0004488 A1 | 1/2015 | Abdelsalam et al. | |
| 2015/0044571 A1 | 2/2015 | Abdelsalam et al. | |
| 2015/0132644 A1* | 5/2015 | Sonobe | H01M 4/134 429/217 |
| 2015/0162610 A1 | 6/2015 | Zaghib et al. | |

FOREIGN PATENT DOCUMENTS

| | | |
|---|---|---|
| CN | 104094454 A | 10/2014 |
| DE | 112012000825 T5 | 12/2013 |
| EP | 2810321 A1 | 12/2014 |
| EP | 2810322 A1 | 12/2014 |
| FR | 2935546 A1 | 3/2010 |
| GB | 2498802 A | 7/2013 |
| GB | 2498803 A | 7/2013 |
| JP | 2008-117761 A | 5/2008 |
| JP | 2012-501515 A | 1/2012 |
| JP | 2013116059 A * | 6/2013 |
| JP | 103918109 A | 7/2014 |
| JP | 2014-235855 A | 12/2014 |
| JP | 2015-508934 A | 3/2015 |
| JP | 2015-510666 A | 4/2015 |
| JP | 2015-519699 A | 7/2015 |
| KR | 10-2013-0056319 A | 5/2013 |
| KR | 10-2014-0128379 A | 11/2014 |
| KR | 10-2014-0133529 A | 11/2014 |
| KR | 10-2014-0141453 A | 12/2014 |
| TW | 201246669 A | 11/2012 |
| TW | 201345028 A | 11/2013 |
| WO | 2010/026332 A1 | 3/2010 |
| WO | 2012/111688 A1 | 8/2012 |
| WO | 2013/114094 A1 | 8/2013 |
| WO | 2013/114095 A1 | 8/2013 |
| WO | 2013/166598 A1 | 11/2013 |

OTHER PUBLICATIONS

International Search Report and Written Opinion of PCT Application No. PCT/JP2016/002014, dated Jul. 12, 2016, 10 pages of ISRWO.

Office Action for JP Patent Application No. 2017-525791, dated Mar. 5, 2019, 03 pages of Office Action and 03 pages of English Translation.

Office Action for JP Patent Application No. 2017-525791, dated Jun. 25, 2019, 03 pages of Office Action and 03 pages of English Translation.

Office Action for JP Patent Application No. 2017-525791, dated Nov. 5, 2019, 02 pages of Office Action and 02 pages of English Translation.

Office Action for CN Patent Application No. 201680023754.6, dated Mar. 18, 2020, 10 pages of Office Action and 10 pages of English Translation.

Office Action for KR Patent Application No. 10-2017-7029847, dated Dec. 9, 2019, 07 pages of Office Action and 05 pages of English Translation.

Office Action for CN Patent Application No. 201680023754.6, dated Jul. 22, 2020, 8 pages of Office Action and 4 pages of English Translation.

* cited by examiner

NEGATIVE ELECTRODE, BATTERY, BATTERY PACK, ELECTRONIC APPARATUS, ELECTRICALLY DRIVEN VEHICLE, ELECTRICAL STORAGE DEVICE, AND ELECTRIC POWER SYSTEM

CROSS REFERENCE TO RELATED APPLICATIONS

This application is a U.S. National Phase of International Patent Application No. PCT/JP2016/002014 filed on Apr. 14, 2016, which claims priority benefit of Japanese Patent Application No. JP 2015-130798 filed in the Japan Patent Office on Jun. 30, 2015. Each of the above-referenced applications is hereby incorporated herein by reference in its entirety.

TECHNICAL FIELD

The present technology relates to a negative electrode, a battery, a battery pack, an electronic apparatus, an electrically driven vehicle, an electrical storage device, and an electric power system.

BACKGROUND ART

Recently, a portable electronic apparatus such as a cellular phone has become widespread, and a reduction in size and weight, and a long operational lifespan are strongly required. Along with this, a development of a battery such as a lithium ion secondary battery as a power supply of the portable electronic apparatus has been progressed.

In the lithium ion secondary battery, a carbon material has been widely used as a negative electrode active material. Recently, along with higher performance of the portable electronic apparatus, it is demanded to further improve an energy density, and thus examination has been made on use of silicon, tin, and the like, which have a large theoretical capacity, as the negative electrode active material instead of the carbon material.

Patent Document 1 discloses a nonaqueous electrolyte battery which includes a negative electrode that contains Si-containing negative electrode active material particles, a first conductive agent, and a second fibrous conductive agent, and in which the second conductive agent is in contact with at least two Si-containing negative electrode active material particles of which a surface is covered with the first conductive agent.

CITATION LIST

Patent Document

Patent Document 1: Japanese Patent Application Laid-Open No. 2008-117761

SUMMARY OF THE INVENTION

Problems to be Solved by the Invention

An object of the present technology is to provide a negative electrode, a battery, a battery pack, an electronic apparatus, an electrically driven vehicle, an electrical storage device, and an electric power system which are capable of improving cycle characteristics.

Solutions to Problems

To solve the problem, the present technology is a negative electrode, including: a negative electrode active material; and first carbon fiber and second carbon fiber, in which the first carbon fiber has a fiber diameter of equal to or greater than 70 nm and less than 150 nm, and a fiber length of equal to or greater than 1 μm and less than 10 μm, and the second carbon fiber has a fiber diameter of 150 nm or greater or a fiber length of 10 μm or greater.

The present technology is a battery, including: a positive electrode; a negative electrode; and an electrolyte, in which the negative electrode includes a negative electrode active material, first carbon fiber, and second carbon fiber, the first carbon fiber has a fiber diameter of equal to or greater than 70 nm and less than 150 nm, and a fiber length of equal to or greater than 1 μm and less than 10 μm, and the second carbon fiber has a fiber diameter of 150 nm or greater or a fiber length of 10 μm or greater.

According to other aspects of the present technology, there are provided a battery pack, an electronic apparatus, an electrically driven vehicle, an electrical storage device, and an electric power system which include the battery.

Effects of the Invention

According to the negative electrode of the present technology, it is possible to improve cycle characteristics. Even in the battery, the battery pack, the electronic apparatus, the electrically driven vehicle, the electrical storage device, and the electric power system of the present technology, a similar effect can be attained.

MODE FOR CARRYING OUT THE INVENTION

Hereinafter, embodiments of the present technology will be described. Description will be made in the following order.

1. First Embodiment (Example of Cylindrical Battery)
2. Second Embodiment (Example of Laminated Film Type Battery)
3. Third Embodiment (Example of Battery Pack)
4. Fourth Embodiment (Example of Electronic Apparatus)

5. Fifth Embodiment (Example of Electrical Storage System)

6. Sixth Embodiment (Example of Electrically Driven Vehicle)

7. Other Embodiments (Modification Examples)

Furthermore, the following embodiments and the like are appropriate specific examples of the present technology, and the contents of the present technology are not limited to the embodiments. In addition, effects described in this specification are illustrative only, and there is no limitation thereto. In addition, it should be understood that existence of effects different from the exemplified effects are possible.

1. First Embodiment (1-1) Configuration Example of Nonaqueous Electrolyte Battery In a first embodiment of the present technology, description will be given of a cylindrical nonaqueous electrolyte secondary battery (hereinafter, referred to as "nonaqueous electrolyte battery" or simply referred to as "battery") as an example with reference to FIG. 1 and FIG. 2.

Figure 1:
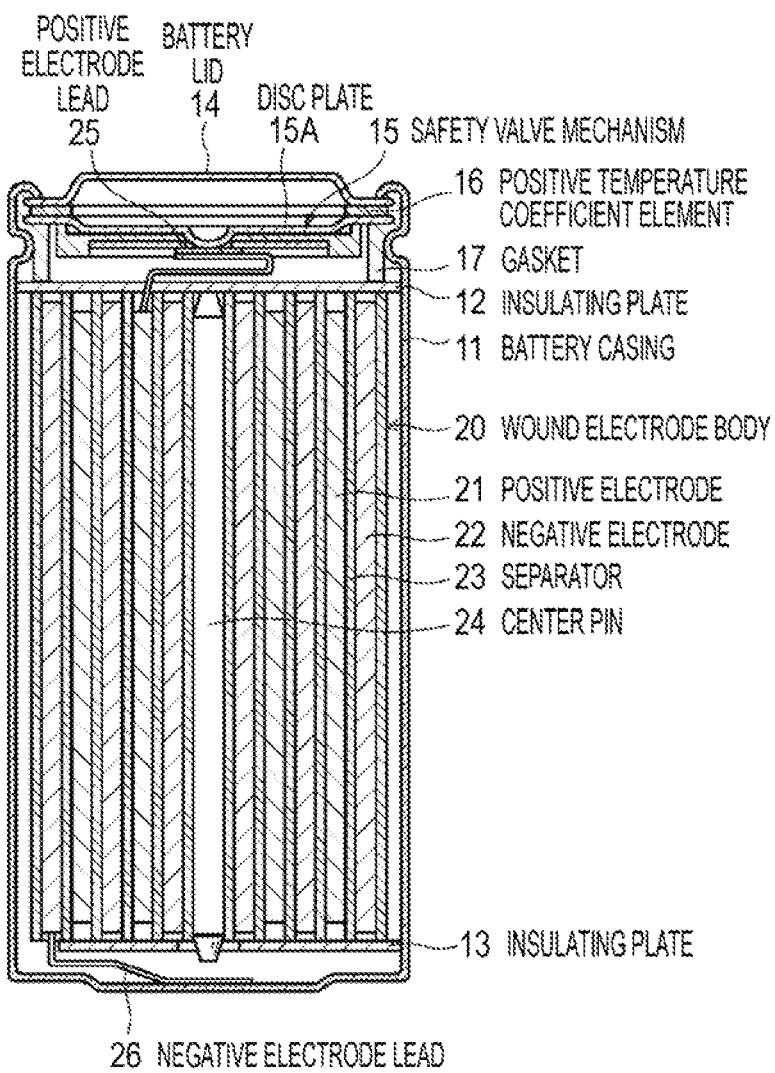
FIG. 1 is a cross-sectional view illustrating a configuration of a battery according to an embodiment of the present technology.

As illustrated in FIG. 1, in the nonaqueous electrolyte battery, mainly, a wound electrode body 20 and a pair of insulating plates 12 and 13 are accommodated in a battery casing 11 having an approximately hollow and cylindrical shape. A battery structure using the battery casing 11 is called a cylindrical type.

For example, the battery casing 11 has a hollow structure in which one end is closed and the other end is opened, and is constituted by iron (Fe), aluminum (Al), alloys thereof, and the like. Furthermore, in a case where the battery casing 11 is constituted by iron, for example, a surface of the battery casing 11 may be plated with nickel (Ni), and the like. The pair of insulating plates 12 and 13 interposes the wound electrode body 20 therebetween from upper and lower sides, and is disposed to extend in a direction perpendicular to a winding peripheral surface of the wound electrode body 20.

A battery lid 14, a safety valve mechanism 15, and a positive temperature coefficient element (PTC element) 16 are caulked into the opened end of the battery casing 11 through a gasket 17, and the battery casing 11 is hermetically sealed. For example, the battery lid 14 is constituted by a material similar to the material of the battery casing 11. The safety valve mechanism 15 and the positive temperature coefficient element 16 are provided on an inner side of the battery lid 14.

The safety valve mechanism 15 is electrically connected to the battery lid 14 through the positive temperature coefficient element 16. In the safety valve mechanism 15, in a case where an inner pressure becomes a constant pressure or higher due to internal short-circuit, heating from an outer side, and the like, a disc plate 15A is inverted to cut off electrical connection between the battery lid 14 and the wound electrode body 20.

In the positive temperature coefficient element 16, as a temperature rises, resistance increases (current is limited) to prevent abnormal heat generation caused by a large current. For example, the gasket 17 is constituted by an insulating material, and asphalt is applied onto a surface of the gasket 17.

In the wound electrode body 20, a positive electrode 21 and a negative electrode 22 are laminated and wound with a separator 23 interposed therebetween. A center pin 24 may be inserted into the center of the wound electrode body 20.

A positive electrode lead 25 is connected to the positive electrode 21 of the wound electrode body 20, and a negative electrode lead 26 is connected to the negative electrode 22. The positive electrode lead 25 is welded to the safety valve mechanism 15 to be electrically connected to the battery lid 14, and the negative electrode lead 26 is welded to the battery casing 11 to be electrically connected thereto.

For example, the positive electrode lead 25 is a thin sheet-shaped conductive member, and is constituted by aluminum and the like. For example, the negative electrode lead 26 is a thin sheet-shaped conductive member, and is constituted by copper (Cu), nickel, stainless steel (SUS), and the like.

(Positive Electrode)

For example, in the positive electrode 21, a positive electrode active material layer 21B is provided on both surfaces of a positive electrode current collector 21A. Furthermore, the positive electrode 21 may include a region in which the positive electrode active material layer 21B is provided only on one surface of the positive electrode current collector 21A.

As the positive electrode current collector 21A, for example, metallic foil such as aluminum foil, nickel foil, and stainless steel foil can be used.

The positive electrode active material layer 21B contains a positive electrode active material. The positive electrode active material layer 21B may contain other materials such as a conductive agent and a binding agent as necessary.

(Positive Electrode Active Material)

As the positive electrode active material, for example, a material capable of intercalating and deintercalating lithium can be used. As the positive electrode active material, for example, a lithium-containing compound can be used.

Examples of the lithium-containing compound include a composite oxide (referred to as "lithium-transition metal composite oxide) that contains lithium and a transition metal element, a phosphate compound (referred to as lithium-transition metal phosphate compound) that contains lithium and a transition metal element, and the like. As the lithium-containing compound, a compound, which contains at least one kind among cobalt (Co), nickel, manganese (Mn), and iron as the transition metal element, is preferable. The reason for this is that a relatively higher voltage is obtained.

Examples of the lithium-transition metal composite oxide include a lithium-transition metal composite oxide having a layered rock salt structure, a lithium-transition metal composite oxide having a spinel structure, and the like.

Examples of the lithium-transition metal composite oxide having the layered rock salt structure include a lithium-containing compound expressed by a general formula $Li_xM1O_2$ (in the formula, M1 represents elements including one or more kinds of transition metal elements. A value of x satisfies a relationship of $0.05 \leq x \leq 1.10$ as an example. The value of x is different depending on a battery charging and discharging state. Furthermore, the value of x is not limited to the relationship), and the like. Specific examples of the lithium-transition metal composite oxide include a lithium-cobalt composite oxide ($Li_xCoO_2$), a lithium-nickel composite oxide ($Li_xNiO_2$), a lithium-nickel-cobalt composite oxide ($Li_xNi_{(1-z)}Co_zO_2$ ($0<z<1$)), a lithium-nickel-cobalt-manganese composite oxide ($Li_xNi_{(1-v-w)}Co_vMn_wO_2$ ($0<v+w<1$, $v>0$, $w>0$)), a lithium-cobalt-aluminum-magnesium composite oxide ($Li_xCo_{(1-p-q)}Al_pMg_qO_2$ ($0<p+q<1$, $p>0$, $q>0$)), and the like.

Examples of the lithium-transition metal composite oxide having a spinel structure include a lithium-manganese composite oxide ($LiMn_2O_4$), a lithium-manganese-nickel composite oxide ($Li_xMn_{2-t}Ni_tO_4$ (0<t<2)), and the like.

Examples of the lithium-transition metal phosphate compound include a lithium-transition metal phosphate compound having an olivine type structure, and the like.

Examples of the lithium-transition metal phosphate compound having an olivine type structure include a lithium-containing compound expressed by a general formula $Li_yM2PO_4$ (in the formula, M2 represents elements including one or more kinds of transition metal elements. A value of y satisfies a relationship of $0.05 \leq y \leq 1.10$ as an example. The value of y is different depending on a battery charging and discharging state. Furthermore, the value of y is not limited to the range), and the like. Specific examples of the lithium-transition metal phosphate compound include lithium-iron phosphate compound ($Li_yFePO_4$), a lithium-iron-manganese phosphate compound ($Li_yFe_{1-u}Mn_uPO_4$ (0<u<1)), and the like.

As the positive electrode active material, coated particles, which include particles of the above-described lithium-containing compound, and a coating layer that is provided on at least a part of a surface of the lithium-containing compound particles, may be used. When using the coated particles, it is possible to further improve battery characteristics.

The coating layer is provided on at least a part of the surface of the particles (base material particles) of the lithium-containing compound that becomes a base material, and has a composition element or a composition ratio that is different from that of the base material particles. Examples of the coating layer include a coating layer including an oxide, a transition metal compound, and the like. Specific example of the coating layer include an oxide that includes at least one of lithium, nickel, and manganese, a compound that includes at least one kind selected from the group consisting of nickel, cobalt, manganese, iron, aluminum, magnesium (Mg), and zinc (Zn), oxygen (O), and phosphorus (P), and the like. The coating layer may include a halide such as lithium fluoride, or a chalcogenide other than oxygen.

Existence of the coating layer can be confirmed by examining a concentration variation of a constituent element from a surface of the positive electrode active material toward the inside thereof. For example, the concentration variation can be obtained by measuring a composition of the lithium-containing compound particles through auger electron spectroscopy (AES) or secondary ion mass spectrometry (SIMS) while cutting the lithium-containing compound particles, on which the coating layer is provided, through sputtering or the like. In addition, the concentration variation can be measured as follows. The lithium-containing compound particles provided with the coating layer is gradually dissolved in an acidic solution, and a variation in an amount of elution with the passage of time is measured through inductively coupled plasma (ICP) spectrometry or the like.

In addition, as the positive electrode active material, for example, an oxide, a disulfide, a chalcogenide (particularly, a layered compound or a spinel-type compound) that does not contain lithium, a conductive polymer, and the like can be used. Examples of the oxide include vanadium oxide ($V_2O_5$), titanium dioxide ($TiO_2$), manganese dioxide ($MnO_2$), and the like. Examples of the disulfide include iron disulfide ($FeS_2$), titanium disulfide ($TiS_2$), molybdenum disulfide ($MoS_2$), and the like. Examples of the chalcogenide that does not contain lithium include niobium diselenide ($NbSe_2$), and the like. Examples of the conductive polymer include sulfur, polyaniline, polythiophene, polyacetylene, polypyrrole, and the like.

The positive electrode active material may be a positive electrode active material other than the above-described positive electrode active materials. In addition, two or more kinds of the above-described positive electrode active materials may be mixed in an arbitrary combination.

(Conductive Agent)

As the conductive agent, for example, a carbon material, and the like can be used. Examples of the carbon material include graphite, carbon black, acetylene black, and the like. Furthermore, the conductive agent may be a metal material, a conductive polymer, and the like as long as these materials have conductivity.

(Binding Agent)

As the binding agent, for example, a resin material and the like can be used. Examples of the resin material include polyvinylidene fluoride (PVdF), polyamideimide (PAI), polytetrafluoroethylene (PTFE), polyacrylonitrile (PAN), styrene butadiene rubber (SBR), carboxymethyl cellulose (CMC), and the like.

(Negative Electrode)

The negative electrode 22 has a structure in which a negative electrode active material layer 22B is provided on both surfaces of a negative electrode current collector 22A. Furthermore, the negative electrode 22 may include a region in which the negative electrode active material layer 22B is provided on only one surface of the negative electrode current collector 22A.

As the negative electrode current collector 22A, for example, metallic foil such as copper foil can be used.

The negative electrode active material layer 22B includes at least a negative electrode active material and carbon fiber. The negative electrode active material layer 22B may contain other materials such as a conductive agent and a binding agent as necessary. As the conductive agent and the binding agent, materials similar to the conductive agent and the binding agent of the positive electrode 21 can be used.

(Negative Electrode Active Material)

As the negative electrode active material, for example, a material capable of intercalating and deintercalating lithium can be used. It is preferable that the negative electrode active material includes at least one of a carbon material and a noncarbon material.

(Carbon Material)

Examples of the carbon material include graphite. Furthermore, a kind of the graphite is not particularly limited. That is, for example, the kind of the graphite may be natural graphite, artificial graphite, or both of the natural graphite and the artificial graphite. In addition, for example, a shape of the graphite may be one kind or two or more kinds such as a fibrous shape, a spheroidal shape, a particle shape, and a squamous shape. A surface of the graphite may be coated or partially modified with one kind or two or more kinds among pitch, a resin, and the like.

Examples of the natural graphite include one kind or two or more kinds of squamous graphite, scale-like graphite, earthy graphite, and the like. Examples of the artificial graphite include one kind or two or more kinds such as mesocarbon microbead (MCMB).

(Noncarbon Material)

The noncarbon material includes a metal-based material. The "metal-based material" is a material that includes one kind or two or more kinds of elements (hereinafter, referred to as "reaction element") capable of reacting with an electrode reaction material as a constituent element. However, carbon is excluded from the reaction element that is described herein. A kind of the reaction element is not particularly limited, and specific examples thereof include one kind or two or more kinds among silicon, tin, and the like.

The "electrode reaction material" is a material that is used in electrode reaction (charging and discharging reaction) in a secondary battery that uses an active material. For example, the electrode reaction material is lithium (Li) in a lithium secondary battery.

As described above, since the metal-based material is a material that includes one kind or two or more kinds of reaction elements as a constituent element, the metal-based material may be an elementary substance, an alloy, a compound, or two or more kinds thereof. That is, the metal-based material may be one kind or two or more kinds among elementary silicon, a silicon alloy, and a silicon compound. Furthermore, the metal-based material may be one kind or two or more kinds among elementary tin, a tin alloy, and a tin compound. In addition, the metal-based material may be two or more kinds among candidates of a series of the metal-based materials. In addition, in the present technology, the term "alloy" also includes an alloy containing one or more kinds of metallic elements and one or more kinds of metalloid elements in addition to the alloy that is constituted by two or more kinds of metallic elements. In addition, the alloy may contain a nonmetallic element. The texture of the alloy includes a solid-solution, a eutectic crystal (a eutectic mixture), an intermetallic compound, and two or more kinds thereof which coexist.

Among these, as the metal-based material, a material, which includes one or both of silicon and tin as a constituent element, is preferable, and a material, which includes silicon as the constituent element, is more preferable. The reason for this is that a high energy density is obtained.

Details of the silicon alloy and the silicon compound are as follows.

For example, the silicon alloy includes one kind or two or more kinds among tin, nickel, copper, iron, cobalt, manganese, zinc, indium (In), silver (Ag), titanium (Ti), germanium (Ge), bismuth (Bi), antimony (Sb), chromium (Cr), and the like as a constituent element other than silicon. For example, the silicon compound includes one kind or two or more kinds among carbon, oxygen, and the like as a constituent element other than silicon. Furthermore, the silicon compound may include one kind or two or more kinds of the constituent elements other than silicon as a constituent element other than silicon.

Specific examples of the silicon alloy and the silicon compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), LiSiO, and the like. Furthermore, in $SiO_v$, v may satisfy a relationship of $0.2<v<1.4$. Furthermore, the silicon alloy may be coated or partially modified with one kind or two or more kinds among low-crystalline carbon, high-crystalline carbon, graphite, and the like by using one kind or two or more kinds among a liquid-phase method, a vapor-phase method, a solid-phase method, and the like. The reason for the coating or partial modification is similar to the reason relating to the silicon compound.

Details of the tin alloy and the tin compound are similar to the details of the silicon alloy and the silicon compound except that tin is used instead of silicon, and silicon is also included in the constituent element other than tin. Specific examples of the tin alloy and the tin compound include $SnO_x$ ($0<x\leq2$), $SnSiO_3$, LiSnO, $Mg_2Sn$, and the like.

However, examples of the tin alloy and the tin compound also include a material to be described below. Examples of the material include a material (Sn-containing material) that includes second and third constituent elements in combination of tin as a first constituent element. Examples of the second constituent element include one kind or two or more kinds among cobalt, iron, magnesium, titanium, vanadium (V), chromium, manganese, nickel, copper, zinc, gallium (Ga), zirconium (Zr), niobium (Nb), molybdenum (Mo), silver, indium, cesium (Ce), hafnium, tantalum, tungsten, bismuth, silicon, and the like. Examples of the third constituent element include one kind or two or more kinds among boron (B), carbon, aluminum, phosphorous, and the like.

Among these, it is preferable that the Sn-containing material is a material (SnCoC-containing material) that includes tin, cobalt, and carbon as a constituent element. In the SnCoC-containing material, for example, the amount of carbon contained is 9.9 wt % to 29.7 wt %, and a ratio (Co/(Sn+Co)) of the amount of tin and cobalt contained is 20 wt % to 70 wt %. The reason for this is that a high energy density is obtained.

It is preferable that the SnCoC-containing material has a phase that includes tin, cobalt, and carbon, and the phase is low-crystalline or amorphous. The phase is a phase (reaction phase) capable of reacting with an electrode reaction material, and thus excellent characteristics are obtained due to existence of the reaction phase. In a case where a CuKα-ray is used as a specific X-ray, and a scanning speed is set to 1°/min, it is preferable that the full width at half maximum (diffraction angle 2θ) of a diffraction peak of a reaction phase in X-ray diffraction is 1° or greater. The reason for the preference is that the electrode reaction material is more smoothly intercalated and deintercalated, and reactivity with an electrolyte is reduced. Furthermore, the SnCoC-containing material may include a phase in which elementary substances or parts of respective constituent elements are included in addition to the low-crystalline or amorphous phase.

It is possible to easily determine whether or not a diffraction peak obtained through X-ray diffraction corresponds to a phase (reaction phase) capable of reacting with the electrode reaction material by comparing X-ray diffraction charts before and after an electrochemical reaction with the electrode reaction material. For example, when a position of a diffraction peak varies before and after the electrochemical reaction with the electrode reaction material, the diffraction peak corresponds to a phase capable of reacting with the electrode reaction material. In this case, for example, a diffraction peak of the low-crystalline or amorphous reaction phase is detected in a range of 2θ=20° to 50°. It is considered that the reaction phase includes, for example, the above-described respective constituent elements, and is in a low-crystalline state or an amorphous state, mainly, due to existence of carbon.

In the SnCoC-containing material, it is preferable that at least a part of carbon that is a constituent element is bonded to a metallic element or a metalloid element that is another constituent element. The reason for this is that aggregation or crystallization of tin and the like is suppressed. A bonding state of elements can be confirmed, for example, by using X-ray photoelectron spectroscopy (XPS). In a commercially available apparatus, for example, as a soft X-ray, an Al—Kα ray, a Mg—Kα ray, and the like are used. In a case where at least a part of carbon is bonded to a metallic element, a metalloid element, and the like, in carbon, a peak of a combined wave of the 1s orbital (C1s) is shown in a region lower than 284.5 eV. Furthermore, it is assumed that energy calibration is performed so that a peak of the 4f orbital (Au4f) of a gold atom is obtained at 84.0 eV. At this time, typically, surface-contaminated carbon exists on a material surface, and thus the C1s peak of the surface-contaminated carbon is set to 284.8 eV, and this peak is used as an energy reference. In analysis measurement using the XPS, a waveform of the C1s peak is obtained in a form that includes both the peak of the surface-contaminated carbon and the peak of the carbon in the SnCoC-containing material. Accordingly, the peak of the surface-contaminated carbon and the peak of the carbon in the SnCoC-containing material are separated from each other, for example, through analysis conducted by using commercially available software. In the waveform analysis, a position of a main peak that exists on a minimum binding energy side is used as an energy reference (284.8 eV).

Furthermore, the SnCoC-containing material is not limited to a material (SnCoC) in which only tin, cobalt, and carbon are included as the constituent element. For example, the SnCoC-containing material may include one kind or two or more kinds among silicon, iron, nickel, chromium, indium, niobium, germanium, titanium, molybdenum, aluminum, phosphorus, gallium, and bismuth in addition to tin, cobalt, and carbon.

In addition to the SnCoC-containing material, a material (SnCoFeC-containing material) that includes tin, cobalt, iron, and carbon as a constituent element is also preferable. A composition of the SnCoFeC-containing material may be arbitrary. As an example, in a case where the amount of iron contained is set to be small, the amount of carbon contained is set to 9.9 wt % to 29.7 wt %, the amount of iron contained is set to 0.3 wt % to 5.9 wt %, and a ratio (Co/(Sn+Co)) of the amount of tin and cobalt contained is 30 wt % to 70 wt %. In addition, in a case where the amount of iron contained is set to be large, the amount of carbon contained is set to 11.9 wt % to 29.7 wt %, a ratio ((Co+Fe)/(Sn+Co+Fe)) of the amount of tin, cobalt, and iron contained is set to 26.4 wt % to 48.5 wt %, and a ratio (Co/(Co+Fe)) of the amount of cobalt and iron is set to 9.9 wt % to 79.5 wt %. The reason for this is that a high energy density is obtained in the composition range. Furthermore, physical properties (full width at half maximum and the like) of the SnCoFeC-containing material are similar to the physical properties of the SnCoC-containing material.

Furthermore, the negative electrode active material may include one kind or two or more kinds of other materials.

Examples of the other materials include one kind or two or more kinds of materials such as a metal oxide and a polymeric compound. However, the metal-based material is excluded from the metal oxide described here. Examples of the metal oxide include iron oxide, ruthenium oxide, molybdenum oxide, and the like. Examples of the polymeric compound include polyacetylene, polyaniline, polypyrrole, and the like. However, the other materials may be materials other than the above-described materials.

The negative electrode active material may be a negative electrode active material other than the above-described negative electrode active materials. In addition, two or more kinds of the above-described negative electrode active materials may be mixed in an arbitrary combination.

(Carbon Fiber)

The carbon fiber is a fibrous carbon material, and includes as least first carbon fiber and second carbon fiber. When using the first carbon fiber and the second carbon fiber in combination with the negative electrode active material, a satisfactory conductive network can be formed in the vicinity of the negative electrode active material particles and at the entirety of the negative electrode active material layer, and it is possible to suppress collapse of a conductive path between negative electrode active material particles due to expansion and shrinkage along with charging and discharging of the negative electrode active material. As a result, it is possible to improve cycle characteristics. In a case where at least one of a material that includes silicon and a material that include tin, or the like is used as the negative electrode active material, expansion and shrinkage along with charging and discharging is significant, and thus it is particularly effective to use the first carbon fiber and the second carbon fiber.

(First Carbon Fiber)

As the first carbon fiber, carbon fiber, of which a fiber diameter is equal to or greater than 70 nm and less than 150 nm, and a fiber length is equal to or greater than 1 µm and less than 10 µm, can be used.

The first carbon fiber has a small diameter (equal to or greater than 70 nm and less than 150 nm) and a short length (equal to or greater than 1 µm and less than 10 µm), and thus the first carbon fiber is likely to be adsorbed to a particle surface of the negative electrode active material. The first carbon fiber is likely to be adsorbed to a particle surface of the negative electrode active material (for example, a non-carbon material such as a material that includes silicon), it is possible to secure an electron path on the particle surface and in the vicinity thereof, and it is possible to suppress collapse of the electron path on the particle surface and in the vicinity thereof in conformity to expansion and shrinkage of the negative electrode active material along with a cycle. When the first carbon fiber having the characteristics is included in the negative electrode active material layer 22B in combination with the negative electrode active material, it is possible to improve cycle characteristics.

Furthermore, the fiber diameter and the fiber length of the carbon fiber can be defined by measuring the fiber length and the fiber diameter of an arbitrary number of pieces of carbon fiber (for example, 20 pieces, and the like), for example, by using an electron microscope such as a transmission electron microscope (TEM) and a scanning electron microscope (SEM), and by calculating an average value.

(Second Carbon Fiber)

As the second carbon fiber, carbon fiber, of which a fiber diameter is 150 nm or greater or a fiber length is 10 µm or greater, can be used.

Since the second carbon fiber has a large diameter (150 nm or greater) and a long length (10 µm or greater), even in an environment in which a distance between negative electrode active material particles becomes wider along with long-term cycle progress, it is possible to contribute to a conductive network between particles. When using the second carbon fiber having the characteristics in combination with the negative electrode active material and the first carbon fiber, it is possible to realize a further improvement in the cycle characteristics. Furthermore, in a case where the upper limits of the fiber diameter and the fiber length of the second carbon fiber are defined, as the second carbon fiber, for example, carbon fiber of which a fiber diameter is 150 nm to 300 nm or a fiber length is 10 µm to 50 µm is preferable.

(Specific Surface Areas of First Carbon Fiber and Second Carbon Fiber)

It is preferable that a specific surface area of the first carbon fiber is less than 50 m$^2$/g. Similarly, it is preferable that a specific surface area of the second carbon fiber is less than 50 m$^2$/g. The reason for this is that it is possible to suppress a negative electrode reaction area during charging, and it is possible to suppress the amount of reversible Li that is lost in film formation, and thus it is possible to further improve initial efficiency in comparison to a case of using a conductive agent having a large specific surface area. In addition, it is possible to suppress the amount of a solvent during manufacturing of negative electrode mixture slurry due to a reduction in a specific surface area of a material, and it is also effective in shortening of a drying process, suppression of material segregation in the drying process, and an improvement in coating properties. Furthermore, the specific surface area can be measured by using a BET method.

(Amount of First Carbon Fiber and Second Carbon Fiber Contained)

It is preferable that a total mass of the first carbon fiber and the second carbon fiber is equal to or greater than 0.1 wt % and less than 10 wt % with respect to the total mass of a negative electrode constituent material when considering that a more excellent effect can be obtained. Furthermore, the "total mass of the negative electrode constituent material" represents a total mass of a material that constitutes the negative electrode active material layer 22B, and for example, a total mass of the negative electrode active material, the first carbon fiber, and the second carbon fiber (including other materials such as a conductive agent and a binding agent in a case of being included).

(Separator)

The separator 23 separates the positive electrode 21 and the negative electrode 22 from each other, and allows lithium ion to be transmitted therethrough while preventing current short-circuit caused by contact between the both electrodes.

For example, the separator 23 is a porous membrane that includes a resin. For example, the porous membrane that includes a resin is obtained by shaping a resin material by a stretching and perforating method, a phase separating method, and the like. Furthermore, a method of manufacturing the porous film that includes a resin is not limited to the methods.

As the resin material that constitutes the separator 23, for example, a polyolefin resin such as polypropylene and polyethylene, an acrylic resin, a styrene resin, a polyester resin, a nylon resin, and the like can be used.

The separator 23 may have a structure in which two or more of porous membranes that include a resin are stacked. The porous membrane that includes a resin may be a porous membrane in which two or more kinds of resin materials are mixed (a porous membrane that is formed by melting and kneading two or more kinds of resin materials). The porous membrane that includes the polyolefin resin is preferable when considering that separating properties between the positive electrode 21 and the negative electrode 22 are excellent and it is possible to further reduce occurrence of internal short-circuit.

The separator 23 may be non-woven fabric. The non-woven fabric is a structure in which a plurality of pieces of fiber are joined or intertwined, or joined and intertwined without being woven or knitted. As a raw material of the non-woven fabric, the majority of materials capable of being processed into fiber can be used, and a function in accordance with a purpose and a use can be provided by adjusting a shape such as a fiber length and a fiber thickness.

Examples of the non-woven fabric include air-permeable membranes (polyethyleneterephthalate non-woven fabric) which use polyethyleneterephthalate (PET), and the like. Furthermore, the air-permeable membranes represent membranes having air-permeability. In addition, examples of the non-woven fabric include air-permeable membranes which use aramid fiber, glass fiber, cellulose fiber, polyolefin fiber, nylon fiber, and the like. The non-woven fabric may use two or kinds of fiber.

The separator 23 may include particles such as inorganic particles and organic particles. Examples of the separator 23 include a separator that includes a base material and a surface layer formed on at least one of both main surfaces of the base material. Examples of the base material include the porous membrane, the non-woven fabric, and the like which include the resin. Examples of the surface layer include a porous layer that includes a resin material and particles, and the like. For example, the resin material may be fibrillated, and may have a three-dimensional network structure in which fibrils are continuously connected to each other.

(Particles)

As particles, for example, at least one side of inorganic particles and organic particles can be used. Specific examples of the inorganic particles include a metal oxide, a metal oxide hydrate, a metal hydroxide, a metal nitride, a metal carbide, a metal sulfide, a mineral, and the like which are electrically insulating inorganic particles.

Examples of the metal oxide or the metal oxide hydrate include aluminum oxide (alumina, $Al_2O_3$), boehmite ($Al_2O_3 \cdot H_2O$ or AlOOH), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), zinc oxide (ZnO), and the like.

Examples of the metal nitride include silicon nitride ($Si_3N_4$), aluminum nitride (AlN), boron nitride (BN), titanium nitride (TiN), and the like. Examples of the metal carbide include silicon carbide (SiC), boron carbide ($B_4C$), and the like. Examples of the metal sulfide include barium sulfide ($BaSO_4$), and the like.

Examples of the metal hydroxide include aluminum hydroxide ($Al(OH)_3$), and the like. Examples of the mineral include porous aluminosilicate such as zeolite ($M_{2/n}O \cdot Al_2O_3 \cdot xSiO_2 \cdot yH_2O$, M represents a metallic element, $x \geq 2$, $y \geq 0$), layered silicate such as talc ($Mg_3Si_4O_{10}(OH)_2$), bariumtitanate ($BaTiO_3$), strontium titanate ($SrTiO_3$), and the like.

Examples of other inorganic particles include particles of a lithium compound, particles of a carbon material, and the like. Examples of the lithium compound include $Li_2O_4$, $Li_3PO_4$, LiF, and the like. Examples of the carbon material include graphite, carbon nanotube, diamond, and the like.

The inorganic particles may be used alone or two or more kinds thereof may be mixed and used. The shape of the inorganic particles is not particularly limited, and a spherical shape, a fibrous shape, a needle shape, a squamous shape, a sheet shape, and the like are possible.

Examples of the material that constitutes the organic particles include a fluorine-containing resin such as polyvinylidene fluoride and polytetrafluoroethylene, a fluorine-containing rubber such as a vinylidene fluoride-tetrafluoroethylene copolymer and an ethylene-tetrafluoroethylene copolymer, rubbers such as a styrene-butadiene copolymer or a hydride thereof, an acrylonitrile-butadiene copolymer or a hydride thereof, an acrylonitrile-butadiene-styrene copolymer or a hydride thereof, a methacrylic acid ester-acrylic acid ester copolymer, a styrene-acrylic acid ester copolymer, an acrylonitrile-acrylic acid ester copolymer, an ethylene propylene rubber, polyvinyl alcohol, and polyvinyl acetate, a cellulose derivative such as ethyl cellulose, methyl cellulose, hydroxyethyl cellulose, and carboxymethyl cellulose, a resin such as polyphenylene ether, polysulfone, polyether sulfone, polyphenylene sulfide, polyetherimide, polyimide, polyamide such as wholly aromatic polyamide (aramide), polyamideimide, polyacrylonitrile, polyvinyl alcohol, polyether, an acrylic acid resin, and polyester with high heat resistance in which at least one of a melting point and a glass transition temperature is 180° C. or higher, and the like.

The materials may be used alone or two or more kinds thereof may be mixed and used. The shape of the organic particles is not particularly limited, and a spherical shape, a fibrous shape, a needle shape, squamous shape, a sheet shape, and the like are possible.

(Electrolytic Solution)

The separator 23 is impregnated with an electrolytic solution that is a liquid electrolyte. For example, the electrolytic solution is a nonaqueous electrolytic solution that includes an electrolyte salt and a nonaqueous solvent that dissolves the electrolyte salt. The nonaqueous electrolytic solution may include an additive and the like as necessary.

As the nonaqueous solvent, cyclic carbonic acid ester such as ethylene carbonate and propylene carbonate can be used, and it is preferable to use a nonaqueous solvent obtained after mixing of any one of ethylene carbonate and propylene carbonate, particularly, both of these. The reason for this is that it is possible to improve cycle characteristics.

As the nonaqueous solvent, it is preferable to use a nonaqueous solvent obtained after mixing of chain carbonic acid ester such as diethyl carbonate, dimethyl carbonate, ethyl methyl carbonate, and methyl propyl carbonate in addition to the cyclic carbonic acid ester. The reason for this is that it is possible to obtain high ion conductivity.

As the nonaqueous solvent, it is preferable to further include 2,4-difluoroanisole or vinylene carbonate. The reason for this is that 2,4-difluoroanisole can improve discharging capacity and vinylene carbonate can improve cycle characteristics. Accordingly, in a case where these are mixed and are used, it is possible to improve discharging capacity and cycle characteristics, and thus this case is preferable.

In addition to these, examples of the nonaqueous solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropylnitrile, N,N-dimethylformamide, N-methylpyrrolidinone, N-methyloxazolidinone, N,N-dimethylimidazolidinone, nitromethane, nitroethane, sulfolane, dimethylsulfoxide, trimethyl phosphate, and the like.

Furthermore, a compound, in which at least a part of hydrogen in the nonaqueous solvents is substituted with fluorine, may improve reversibility of an electrode reaction depending on the kind of electrodes which are combined, and thus the compound may be preferable in some cases.

For example, the electrolyte salt contains one kind or two or more kinds of light metal compounds such as a lithium salt. Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), and the like. Among these, at least one kind among lithium hexafluorophosphate, lithium tetrafluoroborate, lithium perchlorate, and lithium hexafluoroarsenate is preferable, and lithium hexafluorophosphate is more preferable.

(Operation of Nonaqueous Electrolyte Battery)

In the nonaqueous electrolyte battery, for example, in charging, a lithium ion is deintercalated from the positive electrode 21 and is intercalated to the negative electrode 22 though an electrolytic solution that is impregnated to the separator 23. On the other hand, in discharging, for example, a lithium ion is deintercalated from the negative electrode 22, and is intercalated to the positive electrode 21 through the electrolytic solution that is impregnated to the separator 23.

In the nonaqueous electrolyte battery, an open-circuit voltage (that is, a battery voltage) in a fully charged state is designed to be, for example, in a range of 3.60 V to 6.00 V, preferably 4.25 V to 6.00 V, and more preferably 4.30 V to 4.50 V. For example, in a case where the open-circuit voltage in the fully charged state is 4.25 V or greater in a battery that use a layered rock salt type lithium composite oxide and the like as the positive electrode active material, even in the same positive electrode active material, the amount of lithium deintercalated per unit mass further increases in comparison to a battery of which the open-circuit voltage is 4.20 V, and thus the amount of the positive electrode active material and the amount of the negative electrode active material are adjusted in accordance with this phenomenon. As a result, a high energy density is obtained.

(1-2) Method of Manufacturing Nonaqueous Electrolyte Battery

For example, the nonaqueous electrolyte battery is manufactured by the following procedure.

First, the positive electrode 21 is prepared. First, a positive electrode active material, and as necessary, a binding agent, a conductive agent, and the like are mixed to prepare a positive electrode mixture. Then, the positive electrode mixture is dispersed, for example, in an organic solvent and the like to prepare positive electrode mixture slurry having a paste shape or a slurry shape.

Next, the positive electrode mixture slurry is uniformly applied to both surfaces of the positive electrode current collector 21A and is dried to form the positive electrode active material layer 21B. Finally, the positive electrode active material layer 21B is compression-molded by using a roll pressing device and the like while being heated as necessary. In this case, the compression molding may be repeated a plurality of times.

Next, the negative electrode 22 is prepared in a similar sequence as in the positive electrode 21. First, a negative electrode active material, first carbon fiber, second carbon fiber, and as necessary, a binding agent, a conductive agent, and the like are mixed to prepare a negative electrode mixture, and the negative electrode mixture is dispersed, for example, in an organic solvent to prepare a negative electrode mixture slurry having a paste shape or a slurry shape. Furthermore, at this time, when a mass ratio of the carbon fiber is set to 10% or greater with respect to the negative electrode mixture, slurry properties and initial efficiency tend to deteriorate, and thus it is preferable that the mass ratio is set to be less than 10%.

The negative electrode mixture slurry is uniformly applied to both surfaces of the negative electrode current collector 22A and is dried to form the negative electrode active material layer 22B. Then, the negative electrode active material layer 22B is compression-molded.

Finally, the nonaqueous electrolyte battery is assembled by using the positive electrode 21 and the negative electrode 22. First, the positive electrode lead 25 is attached to the positive electrode current collector 21A through welding and the like, and the negative electrode lead 26 is attached to the negative electrode current collector 22A through welding and the like. Continuously, the positive electrode 21 and the negative electrode 22 are laminated through the separator 23 and the resultant laminated body is wound to prepare the wound electrode body 20. Then, the center pin 24 is inserted into the winding center.

Figure 2:
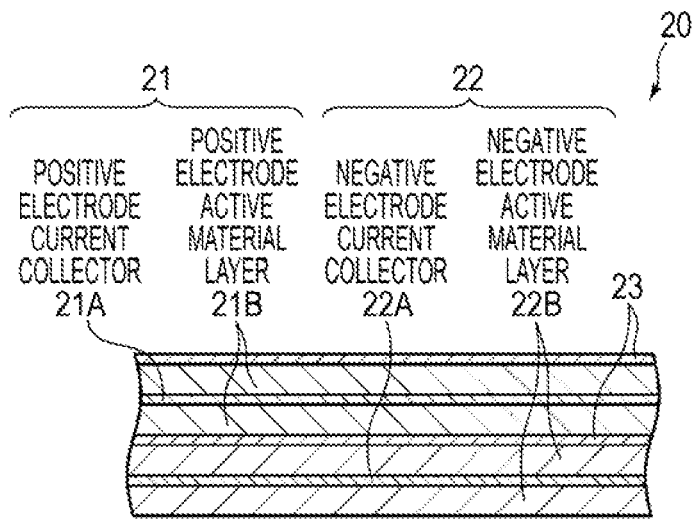
FIG. 2 is an enlarged cross-sectional view illustrating a part of a wound electrode body illustrated in FIG. 1.

Continuously, the wound electrode body 20 is accommodated in the battery casing 11 while being interposed between the pair of insulating plates 12 and 13. In this case, the tip end of the positive electrode lead 25 is attached to the safety valve mechanism 15 through welding and the like, and the tip end of the negative electrode lead 26 is welded to the battery casing 11 through welding and the like. Continuously, an electrolytic solution is injected to the inside of the battery casing 11 to impregnate the separator 23 with the electrolytic solution. Finally, the battery lid 14, the safety valve mechanism 15, and the positive temperature coefficient element 16 are caulked to the opened end of the battery casing 11 through the gasket 17. Accordingly, the nonaqueous electrolyte battery illustrated in FIG. 1 and FIG. 2 is obtained.

(Effect)

In the battery according to the first embodiment of the present technology, the negative electrode includes the first carbon fiber and the second carbon fiber in combination with the negative electrode active material. The first carbon fiber is likely to be adsorbed to a surface of the negative electrode active material, and thus it is possible to secure an electron path on the surface of the negative electrode active material and in the vicinity thereof. In addition, it is possible to suppress collapse of the electron path on the particle surface and in the vicinity thereof in conformity to expansion and shrinkage of the negative electrode active material along with a cycle. Accordingly, it is possible to improve cycle characteristics. Even in an environment in which a distance between negative electrode active material particles becomes wider along with long-term cycle progress, the second carbon fiber can contribute to a conductive network between particles. Accordingly, it is possible realize a further improvement in the cycle characteristics.

Furthermore, in the nonaqueous electrolyte battery described in Patent Document 1 (Japanese Patent Application Laid-Open No. 2008-117761), the first conductive agent having an average diameter of 5 nm to 60 nm, and thus it is possible to improve conductivity on a particle surface of the Si-containing negative electrode active material, but it is difficult to contribute to the conductive network between adjacent particles. In addition, the first conductive agent has a specific surface area as large as 200 to 800 $m^2/g$, and thus there is a concern that capacity decreases due to an increase in a charging loss.

2. Second Embodiment (2-1) Configuration Example of Laminated Film Type Battery

Figure 3:
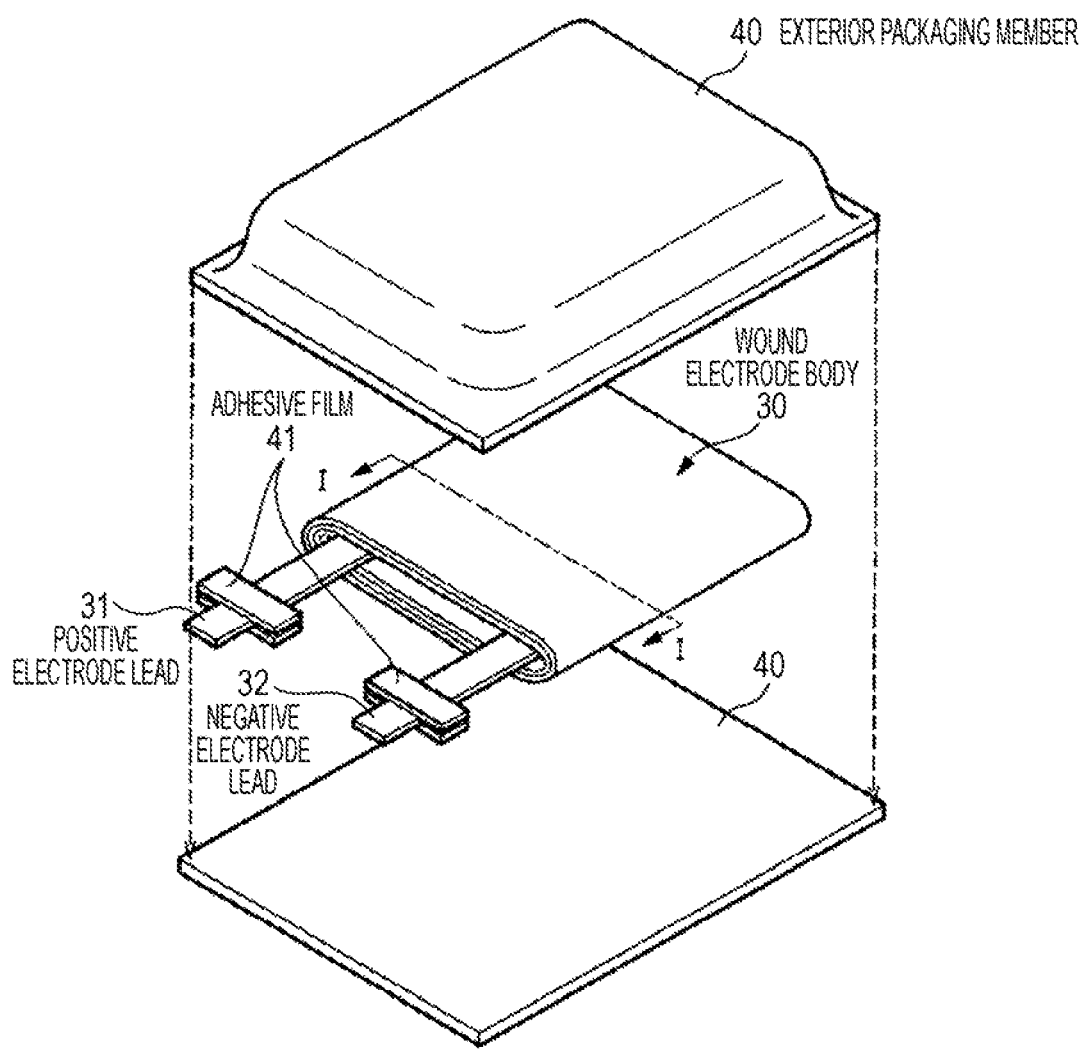
FIG. 3 is an exploded perspective view illustrating a configuration example of a battery according to another embodiment of the present technology.
Figure 4:
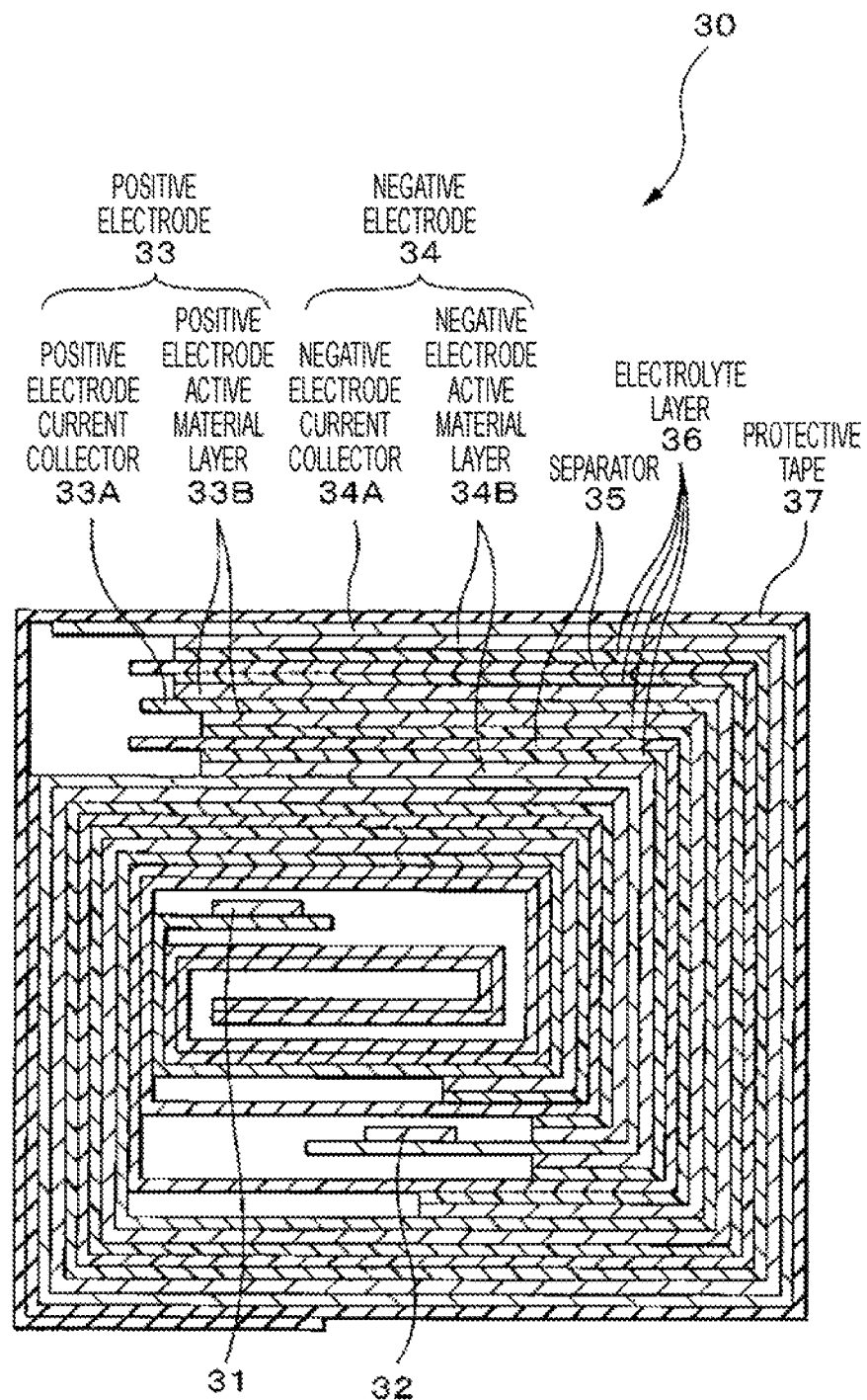
FIG. 4 is a cross-sectional view illustrating a cross-sectional configuration along line I-I in a wound electrode body illustrated in FIG. 3.

In the second embodiment of the present technology, description will be given of a laminated film type battery as an example with reference to FIG. 3 and FIG. 4.

In the nonaqueous electrolyte battery, a wound electrode body 30 is accommodated in an exterior packaging member 40. A positive electrode lead 31 and a negative electrode lead 32 are attached to the wound electrode body 30. For example, the positive electrode lead 31 and the negative electrode lead 32 protrude from the inside of the exterior packaging member 40 toward the outside in the same direction.

(Exterior Packaging Member)

The exterior packaging member 40 is a film-shaped member. For example, the exterior packaging member 40 is a laminated film in which a fusion layer, a metal layer, and a surface protective layer are laminated in this order. For example, the fusion layer is constituted by a polyolefin resin such as polyethylene and polypropylene, and the like. For example, the metal layer is constituted by aluminum and the like. For example, the surface protective layer is constituted by nylon, polyethyleneterephthalate, and the like. The exterior packaging member 40 may be a laminated film having another lamination structure, a single polymer film, or single metal film.

An adhesive film 41 is interposed between the exterior packaging member 40 and the positive electrode lead 31. Similarly, an adhesive film 41 is interposed between the exterior packaging member 40 and the negative electrode lead 32. For example, the adhesive film 41 is constituted by a material having high adhesiveness with a metal material. Examples of the material include a resin material such as a polyolefin resin.

(Positive Electrode, Negative Electrode, and Separator)

In the wound electrode body 30, a positive electrode 33 and a negative electrode 34 are laminated through a separator 35 and an electrolyte layer 36, and the resultant laminated body is wound. An outermost peripheral portion of the wound electrode body 30 is protected by a protective tape 37. Furthermore, in the wound electrode body 30, the separator 35 may be omitted.

In the positive electrode 33, for example, a positive electrode active material layer 33B is provided on both surfaces of a positive electrode current collector 33A. Configurations of the positive electrode current collector 33A and the positive electrode active material layer 33B are similar to the configurations of the positive electrode current collector 21A and the positive electrode active material layer 21B in the first embodiment. In the negative electrode 34, for example, a negative electrode active material layer 34B is provided on both surfaces of a negative electrode current collector 34A. Configurations of the negative electrode current collector 34A and the negative electrode active material layer 34B are similar to the configurations of the negative electrode current collector 22A and the negative electrode active material layer 22B in the first embodiment. A configuration of the separator 35 is similar to the configuration of the separator 23 in the first embodiment.

(Electrolyte Layer)

In the electrolyte layer 36, an electrolytic solution is retained by a polymeric compound, and may include other materials such as various additives as necessary. For example, the electrolyte layer 36 is a so-called gel-like electrolyte. The reason for this is as follows. The gel-like electrolyte is preferable because high ion conductivity (for example, 1 mS/cm or greater at room temperature) is obtained, and leakage of the electrolytic solution is prevented.

Examples of the polymeric compound include polyacrylonitrile, polyvinylidene fluoride, polytetrafluoroethylene, polyhexafluoropropylene, polyethylene oxide, polypropylene oxide, polyphosphazene,polysiloxane,polyvinyl fluoride,polyvinyl acetate, polyvinyl alcohol, polymethyl methacrylate, polyacrylic acid, Polymethacrylic acid, styrene-butadiene rubber, nitrile-butadiene rubber, polystyrene, polycarbonate, a copolymer of vinylidene fluoride and hexafluoropyrene, and the like. These may be used alone, or a plurality of kinds thereof may be mixed. Among these, the polyvinylidene fluoride or the copolymer of vinylidene fluoride and hexafluoropyrene is preferable. The reason for this is that electrochemical stability is obtained.

The electrolytic solution is similar to the electrolytic solution in the first embodiment. However, in the electrolyte layer 36 that is a gel-like electrolyte, a solvent of the electrolytic solution has a broad concept that includes not only a liquid solvent but also a solvent having ion conductivity capable of dissociating an electrolyte salt. Accordingly, in a case of using a polymeric compound having ion conductivity, the polymeric compound is also included in the solvent.

Furthermore, the electrolytic solution may be used as is instead of the gel-like electrolyte layer 36 in which the electrolytic solution is retained by the polymeric compound. In this case, the separator 35 is impregnated with the electrolytic solution.

(Electrolyte Layer Including Particles)

The electrolyte layer 36 may include particles. As the particles, particles similar to the inorganic particles and the organic particles can be used.

(2-2) Method of Manufacturing Nonaqueous Electrolyte Battery

The nonaqueous electrolyte battery is manufactured, for example, by the following three procedures.

(First Manufacturing Method)

In a first manufacturing method, first, the positive electrode 33 and the negative electrode 34 are prepared in a similar manner as in the first embodiment. An electrolytic solution is prepared by dissolving an electrolyte salt in a nonaqueous solvent.

Next, a precursor solution, which includes the electrolytic solution, the polymeric compound, and the solvent, is prepared, and the precursor solution is applied to the positive electrode 33 and the negative electrode 34. Then, the solvent is volatilized to form the gel-like electrolyte layer 36. Continuously, the positive electrode lead 31 is attached to the positive electrode current collector 33A through welding and the like, and the negative electrode lead 32 is attached to the negative electrode current collector 34A through welding and the like.

Next, the positive electrode 33 and the negative electrode 34, in which the electrolyte layer 36 is formed, are laminated through the separator 35, and the resultant laminated body is wound. Then, the protective tape 37 is stuck on an outermost peripheral portion of the resultant wound body to prepare the wound electrode body 30.

Finally, the wound electrode body 30 is interposed between two sheets of film-shaped exterior packaging members 40, and outer peripheral edges of the exterior packaging members 40 are bonded to each other through thermal fusion and the like to seal the wound electrode body 30. At this time, the adhesive film 41 is inserted between each of the positive electrode lead 31 and the negative electrode lead 32 and each of the exterior packaging members 40. Accordingly, the nonaqueous electrolyte battery illustrated in FIG. 3 and FIG. 4 is obtained.

(Second Manufacturing Method)

In a second manufacturing method, first, the positive electrode lead 31 is attached to the positive electrode 33, and the negative electrode lead 32 is attached to the negative electrode 34. Continuously, the positive electrode 33 and the negative electrode 34 are laminated through the separator 35, and the resultant laminated body is wound. The protective tape 37 is stuck on the outermost peripheral portion of the resultant wound body to prepare a wound body that is a precursor of the wound electrode body 30.

Next, the wound body is inserted between two sheets of film-shaped exterior packaging members 40, and outer peripheral portions excluding one outer peripheral portion on one side are subjected to thermal fusion to be bonded, thereby accommodating the wound body in the resultant bag-shaped exterior packaging member 40. Continuously, a composition for electrolyte, which includes the electrolytic solution, a monomer that is a raw material of the polymeric compound, a polymerization initiator, and as necessary, other materials such as a polymerization inhibitor, is prepared. Then, the composition for electrolyte is injected to the inside of the bag-shaped exterior packaging member 40, and then an opening of the exterior packaging member 40 is sealed through thermal fusion and the like.

Finally, the monomer is polymerized to form a polymeric compound. Accordingly, the gel-like electrolyte layer 36 is formed. As a result, the nonaqueous electrolyte battery is obtained.

(Third Manufacturing Method)

In a third manufacturing method, first, a wound body is formed in a similar manner as in the second manufacturing method except that the separator 35 in which the polymeric compound is applied to both surfaces thereof is used. Then, the wound body is accommodated in the bag-shaped exterior packaging member 40.

Next, an electrolytic solution is prepared and is injected to the inside of the exterior packaging member 40, and then an opening of the exterior packaging member 40 is hermetically sealed through thermal fusion and the like. Finally, the exterior packaging member 40 is heated while being pressurized to bring the separator 35 into close contact with the positive electrode 33 and the negative electrode 34 through the polymeric compound. Accordingly, the polymeric compound is impregnated with the electrolytic solution, and the polymeric compound is gelated to form the electrolyte layer 36. As a result, the nonaqueous electrolyte battery is obtained.

(Effect)

In the battery according to the second embodiment of the present technology, a similar effect as in the first embodiment can be obtained.

3. Third Embodiment

Figure 5:
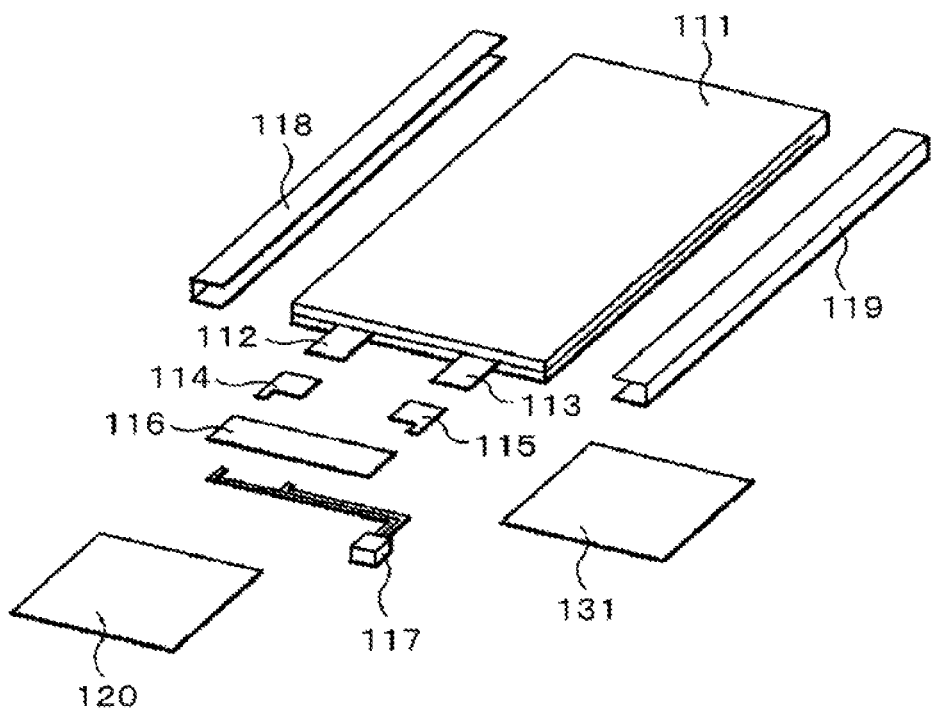
FIG. 5 is a perspective view illustrating a configuration example of a battery pack according to still another embodiment of the present technology.

In the third embodiment of the present technology, description will be given of an example of a configuration of a battery pack with reference to FIG. 5 and FIG. 6.

The battery pack is a simple type battery pack (a so-called a soft pack) using one secondary battery (single battery), and the battery pack is embedded, for example, in an electronic apparatus that is represented by a smart phone, and the like. The battery pack includes a battery cell 111, and a circuit substrate 116 that is connected to the battery cell 111. For example, the battery cell 111 is the laminated film type secondary battery according to the second embodiment.

A pair of adhesive tapes 118 and 119 is stuck on both surfaces of the battery cell 111. A protective circuit (protection circuit module (PCM)) is formed in the circuit substrate 116. The circuit substrate 116 is connected to a positive electrode lead 112 and a negative electrode lead 113 of the battery cell 111 through a pair of tabs 114 and 115, and is connected to a connector-attached lead line 117 for external connection. In addition, in a state in which the circuit substrate 116 is connected to the battery cell 111, the circuit substrate 116 is protected from an upper side and a lower side by a label 120 and an insulating sheet 131. Since the label 120 is stuck, the circuit substrate 116, the insulating sheet 131, and the like are fixed.

Figure 6:
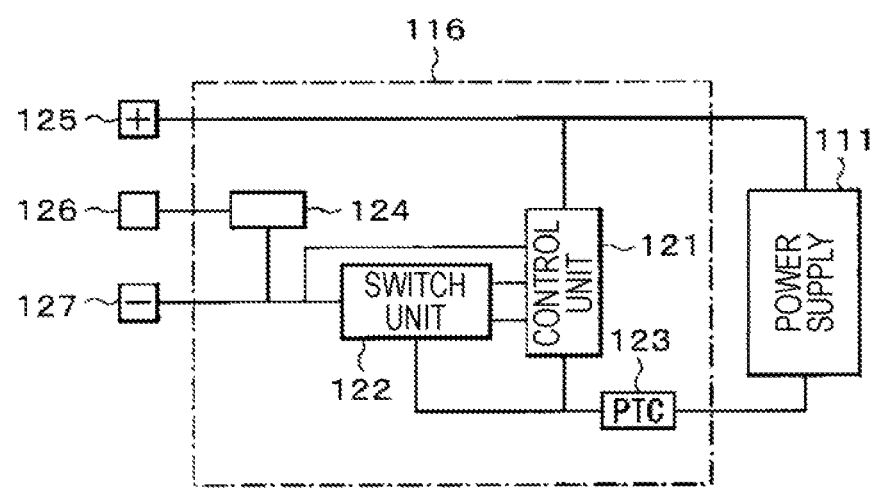
FIG. 6 is a block diagram illustrating a configuration example of the battery pack illustrated in FIG. 5.

In addition, as illustrated in FIG. 6, the battery pack includes the battery cell 111 corresponding to a power supply, and the circuit substrate 116. For example, the circuit substrate 116 includes a control unit 121, a switch unit 122, a PTC 123, and a temperature detecting unit 124. The battery cell 111 is capable of being connected to the outside through a positive electrode terminal 125 and a negative electrode terminal 127, and thus the battery cell 111 is charged and discharged through the positive electrode terminal 125 and the negative electrode terminal 127. The temperature detecting unit 124 can detect a temperature by using a temperature detection terminal (so-called T terminal) 126.

The control unit 121 controls an operation (including a usage state of the battery cell 111) of the entirety of the battery pack, and includes, for example, a central processing unit (CPU), a memory, and the like.

For example, when a battery voltage reaches an over-charging detection voltage, the control unit 121 cuts out the switch unit 122 in order for a charging current not to flow through a current path of the battery cell 111. In addition, for example, when a large current flows during charging, the control unit 121 cuts out the switch unit 122 so as to cut off the charging current.

In addition, for example, when the battery voltage reaches an over-discharging detection voltage, the control unit 121 cuts out the switch unit 122 in order for a discharging current not to flow through the current path of the battery cell 111. In addition, for example, when a large current flows during discharging, the control unit 121 cuts out the switch unit 122 so as to cut off the discharging current.

Furthermore, the over-charging detection voltage of the secondary battery is, for example, 4.20 V±0.05 V, and the over-discharging detection voltage is, for example, 2.4 V±0.1 V.

The switch unit 122 switches the usage state (connection and non-connection between the battery cell 111 and an external apparatus) of the battery cell 111 in response to an instruction of the control unit 121. For example, the switch unit 122 includes a charging control switch, a discharging control switch, and the like. For example, each of the charging control switch and the discharging control switch is a semiconductor switch such as a field effect transistor (MOSFET) using a metal oxide semiconductor. Furthermore, for example, the charging and discharging current is detected on the basis of ON-resistance of the switch unit 122.

The temperature detecting unit 124 measures a temperature of the battery cell 111, and outputs the measurement result to the control unit 121. For example, the temperature detecting unit 124 includes a temperature detecting element such as a thermistor. In addition, the measurement result obtained by the temperature detecting unit 124 is used for a case where the control unit 121 performs a charging and discharging control during abnormal heat generation, a case where the control unit 121 performs a correction process during calculation of a residual capacity, and the like.

Furthermore, the circuit substrate 116 may not include the PTC 123. In this case, a PTC element may be separately provided to the circuit substrate 116.

4. Fourth Embodiment

Figure 7:
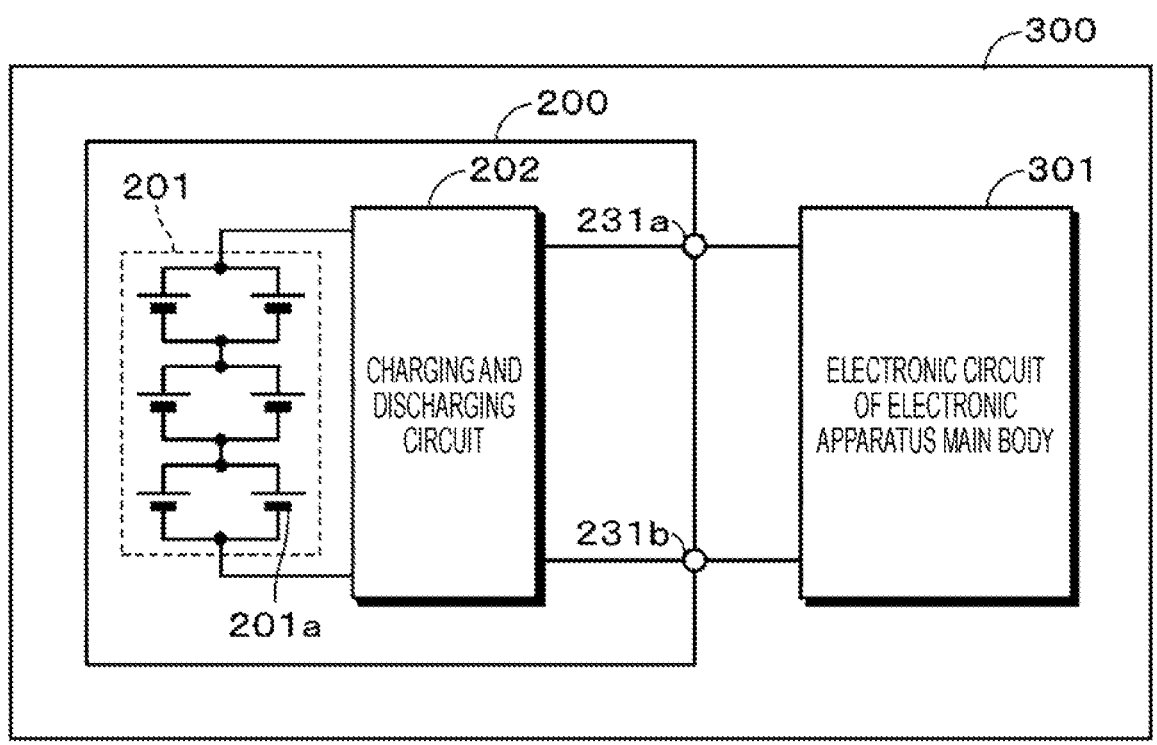
FIG. 7 is a block diagram illustrating a configuration example of an electronic apparatus according to still another embodiment of the present technology.

In the fourth embodiment of the present technology, description will be given of an example of a configuration of an electronic apparatus with reference to FIG. 7.

An electronic apparatus 300 includes an electronic circuit 301 of an electronic apparatus main body, and a battery pack 200. The battery pack 200 is electrically connected to the electronic circuit 301 through a positive electrode terminal 231a and a negative electrode terminal 231b. For example, the electronic apparatus 300 has a configuration in which the battery pack 200 is detachable by a user. Furthermore, the configuration of the electronic apparatus 300 is not limited thereto, and the electronic apparatus 300 may have a configuration in which the battery pack 200 is embedded in the electronic apparatus 300 in order for the user not to detach the battery pack 200 from the electronic apparatus 300.

In charging of the battery pack 200, the positive electrode terminal 231a and the negative electrode terminal 2319b of the battery pack 200 are connected to a positive electrode terminal and a negative electrode terminal of a charger (not illustrated). On the other hand, in discharging of the battery pack 200 (in use of the electronic apparatus 300), the positive electrode terminal 231a and the negative electrode terminal 231b of the battery pack 200 are connected to a positive electrode terminal and a negative electrode terminal of the electronic circuit 301.

Examples of the electronic apparatus 300 include a note-type personal computer, a tablet-type computer, a cellular phone (such as a smartphone), a personal digital assistant (PDA), a display apparatus (such as an LCD, an EL display, an electronic paper, a head-mounted display (HMD)), an image capturing apparatus (such as a digital still camera and a digital video camera), an audio apparatus (such as a portable audio player), a gaming machine, a cordless phone handset, an electronic book, an electronic dictionary, a radio, a headphone, a navigation system, a memory card, a pacemaker, a hearing aid, an electric tool, an electric shaver, a refrigerator, an air conditioner, a television, a stereo, a water heater, a microwave oven, a dishwasher, a washing machine, a dryer, an illumination apparatus, a toy, a medical apparatus, a robot, a road conditioner, a signal apparatus, and the like, and there is no limitation thereto.

(Electronic Circuit)

For example, the electronic circuit 301 includes a CPU, a peripheral logic unit, an interface unit, a storage unit, and the like, and controls the entirety of the electronic apparatus 300.

(Battery Pack)

The battery pack 200 is a battery pack of an assembled battery which includes an assembled battery 201 and a charging and discharging circuit 202. The assembled battery 201 is constituted by connecting a plurality of secondary batteries 201a in series and/or in parallel. For example, the plurality of secondary batteries 201a are connected in a type of n-parallel and m-series (n and m are positive integers). Furthermore, FIG. 7 illustrates an example in which six secondary batteries 201a are connected in a type of 2-parallel and 3-seires (2P3S). As the secondary batteries 201a, the battery according to the first embodiment is used.

In charging, the charging and discharging circuit 202 controls charging with respect to the assembled battery 201. On the other hand, in discharging (that is, in use of the electronic apparatus 300), the charging and discharging circuit 202 controls discharging with respect to the electronic apparatus 300.

The battery according to the first embodiment or the second embodiment, or the battery pack of a single battery according to the third embodiment may be used instead of the battery pack 200.

5. Fifth Embodiment

In the fifth embodiment of the present technology, description will be given of an electrical storage system in which an electrical storage device is provided with the battery according to the first embodiment or the second embodiment.

The electrical storage system may be any system as long as the system uses electric power, and also includes a simple electric power apparatus. For example, the electric power system includes a smart grid, a home energy management system (HEMS), a vehicle, and the like, and can store electricity.

For example, the electrical storage device (electrical storage module) is applied to a power supply for electric power storage in buildings including a house or a power generation facility. Examples of the electrical storage device include an electrical storage module that includes a battery block in which a plurality of batteries are connected to each other at least one of a parallel type or a series type, and a control unit that control charging and discharging of the battery block. In an example of a configuration of the electrical storage device, a plurality of battery blocks are accommodated in an external packaging case. As a battery, the battery according to the first embodiment can be used.

Examples of the electrical storage system include the following first to fifth electrical storage systems, and the like. The first electrical storage system is an electrical storage system in which an electrical storage device is charged by a power generator that performs power generation from renewable energy. A second electrical storage system is an electrical storage system that is provided with an electrical storage device and supplies electric power to an electronic apparatus that is connected to the electrical storage device. A third electrical storage system is an electrical storage system including an electronic apparatus to which electric power is supplied from an electrical storage device. The electrical storage systems are executed as a system that realizes effective power supply in cooperation with an external power supply network.

The fourth electrical storage system is an electric power system that is provided with an electric power information transmitting and receiving unit that transmits and receives a signal to and from other apparatuses through a network, and performs a charging and discharging control of the above-described electrical storage device on the basis of the information that is received by the transmitting and receiving unit. The fifth electrical storage system is an electric power system to which electric power is supplied from the above-described electrical storage device or which supplies electric power from a power generator or an electric power network to the electrical storage device. Hereinafter, description will be given of an electrical storage system that is applied to a house and an electrically driven vehicle.

(Configuration of Electrical Storage System)

Figure 8:
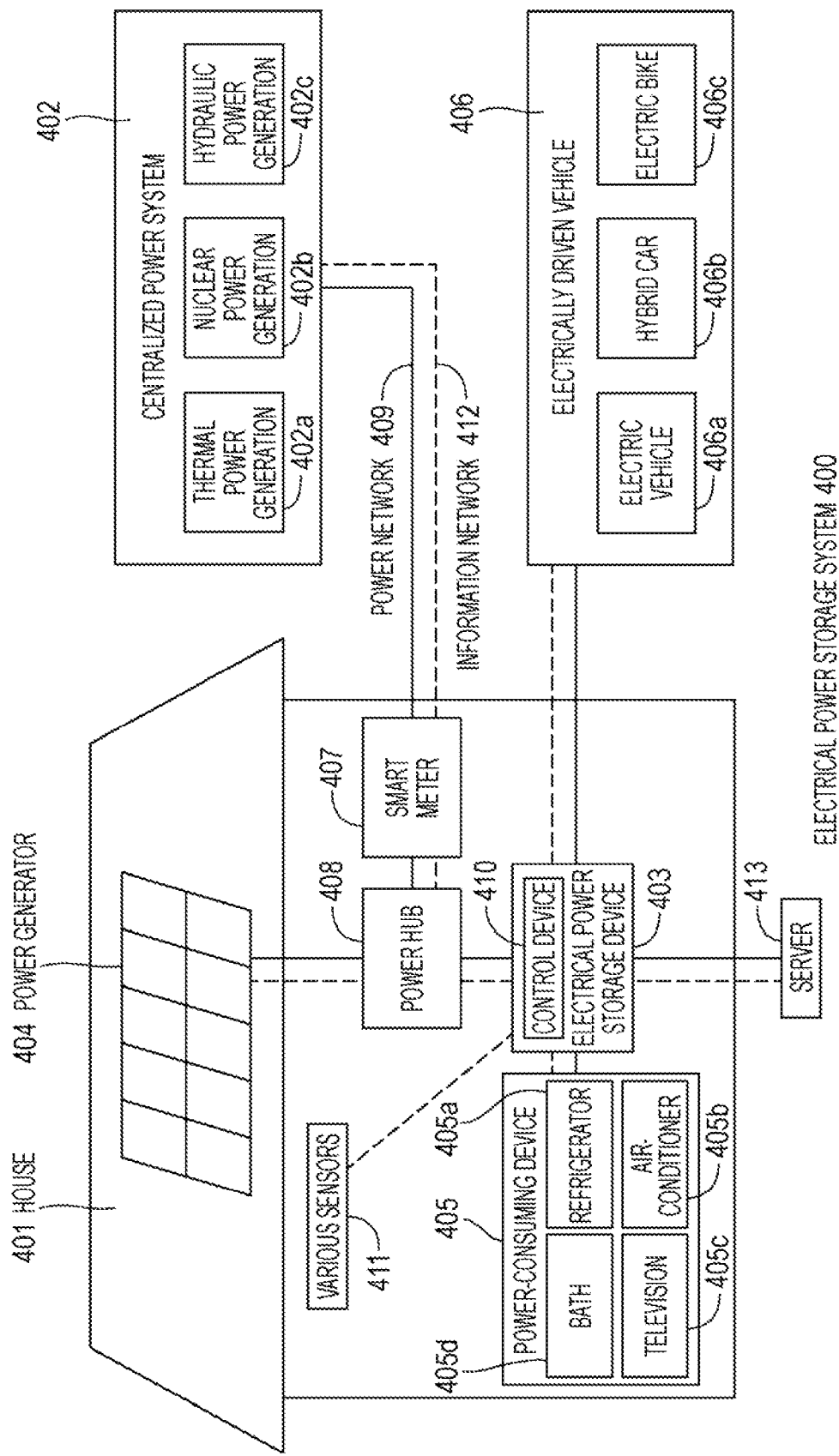
FIG. 8 is a schematic view illustrating a configuration example of an electrical storage system according to still another embodiment of the present technology.

Hereinafter, description will be given of a configuration example of an electrical storage system (electric power system) 400 according to the fifth embodiment with reference to FIG. 8. The electrical storage system 400 is an electrical storage system for house, and electric power is supplied to an electrical storage device 403 from a centralized power system 402 such as thermal power generation 402a, nuclear power generation 402b, hydraulic power generation 402c through a power network 409, an information network 412, a smart meter 407, a power hub 408, and the like. In addition, electric power from an independent power supply such as an in-house power generator 404 is supplied to the electrical storage device 403. The electric power supplied to the electrical storage device 403 is stored. Electric power that is used in the house 401 is supplied by using the electrical storage device 403. A similar electrical storage system may also be used with respect to a building without limitation to the house 401.

The in-house power generator 404, power-consuming devices 405, the electrical storage device 403, a control device 410 that controls respective devices, the smart meter 407, the power hub 408, and sensors 411 which acquire various pieces of information are provided in a house 401. The respective devices are connected by the power network 409 and the information network 412. As the in-house power generator 404, a solar cell, a fuel cell, and the like are used, and generated power is supplied to the power-consuming devices 405 and/or the electrical storage device 403. Examples of the power-consuming devices 405 include a refrigerator 405a, an air-conditioner 405b, a television receiver 405c, a bath 405d, and the like. In addition, examples of the power-consuming device 405 include an electrically driven vehicle 406. Examples of the electrically driven vehicle 406 include an electric vehicle 406a, a hybrid car 406b, an electric bike 406c, and the like.

The electrical storage device 403 includes one or more batteries according to the first embodiment or the second embodiment. The smart meter 407 has a function of measuring the amount of commercial power used and of transmitting the measured amount of commercial power used to a power company. The power network 409 may be any one of a DC power supply type, an AC power supply type, and non-contact power supply type, or a combination of a plurality of the types.

Examples of the various sensors 411 include a motion sensing sensor, a luminance sensor, an object sensing sensor, a power-consumption sensor, a vibration sensor, a contact sensor, a temperature sensor, an infrared sensor, and the like. Information acquired by the various sensors 411 is transmitted to the control device 410. Weather conditions, conditions of human, or the like is grasped by the information transmitted from the sensors 411, and the power-consuming devices 405 are automatically controlled. Accordingly, it is possible to minimize energy consumption. In addition, the control device 410 may transmit information related to the house 401 to an external power company and the like through the Internet.

Processes such as divergence of power lines and DC-AC conversion are performed by the power hub 408. Examples of a communication method of the information network 412 connected to the control device 410 include a method using a communication interface such as a universal asynchronous receiver-transmitter (UART: transmission and reception circuit for asynchronous serial communication), and a method using a sensor network compliant to a wireless communication standard such as Bluetooth (registered trademark), ZigBee, and Wi-Fi. The Bluetooth (registered trademark) method is applied to a multimedia communication and can perform a one-to-multi-connection communication. The ZigBee uses a physical layer of institute of electrical and electronics engineers (IEEE) 802.15.4. IEEE 802.15.4 is the name of a short-range wireless network standard called a personal area network (PAN) or wireless (W) PAN.

The control device 410 is connected to an external server 413. The server 413 may be managed by any one of the house 401, the power company, and a service provider. Examples of information that is transmitted to and received from the server 413 include power-consumption information, life pattern information, power rates, weather information, disaster information, and information related to power transaction. These kinds of information may be transmitted to and received from in-house power-consuming devices (for example, a television receiver), but may be transmitted to and received from devices (for example, cellular phones, or the like) located on an outer side of the house. These kinds of information may be displayed on, for example, a television receiver, a cellular phone, a personal digital assistant (PDA), and the like which have a display function.

The control device 410 that controls each unit includes a central processing unit (CPU), a random access memory (RAM), a read only memory (ROM), and the like, and is accommodated in the electrical storage device 403 in this example. The control device 410 is connected to the electrical storage device 403, the in-house power generator 404, the power-consuming devices 405, the various sensors 411, and the server 413 through the information network 412, and has, for example, a function of adjusting the amount of commercial power used and the amount of power generation. Furthermore, in addition to this function, the control device 410 may have a function of performing power transaction in a power market, and the like.

As described above, a generated output of the in-house power generator 404 (photovoltaic generation and wind power generation) as well as the centralized power system 402 such as the thermal generation 402a, the nuclear power generation 402b, and the hydraulic power generation 402c may be stored in the electrical storage device 403. Accordingly, even when the generated output of the in-house power generator 404 varies, it is possible to make the amount of power transmitted to an outer side uniform, or it is possible to control discharging as much as necessary. For example, a usage method described below may be considered. Specifically, the electric power that is obtained from the photovoltaic generation is stored in the electrical storage device 403, and inexpensive midnight power is also stored in the electrical storage device 403 at night, and then the electric power that is stored in the electrical storage device 403 is discharged to be used in a period of time at which a rate is expensive in the day time.

In addition, in this example, description has been given of an example in which the control device 410 is accommodated in the electrical storage device 403, but the control device 410 may be accommodated in the smart meter 407, or may be configured independently. Furthermore, the electrical storage system 400 may be used in a plurality of homes as targets in regard to an apartment house, or may be used in a plurality of detached houses as targets.

6. Sixth Embodiment

In the sixth embodiment of the present technology, description will be given of an example of an electrically driven vehicle that includes the battery according to the first embodiment or the second embodiment. Examples of the electrically driven vehicle include a railway vehicle, a golf cart, an electrically driven cart, an electric vehicle (including a hybrid car), a working vehicle (such as a tractor and a combine) for farming. Hereinafter, an example of the electric vehicle will be described.

Figure 9:
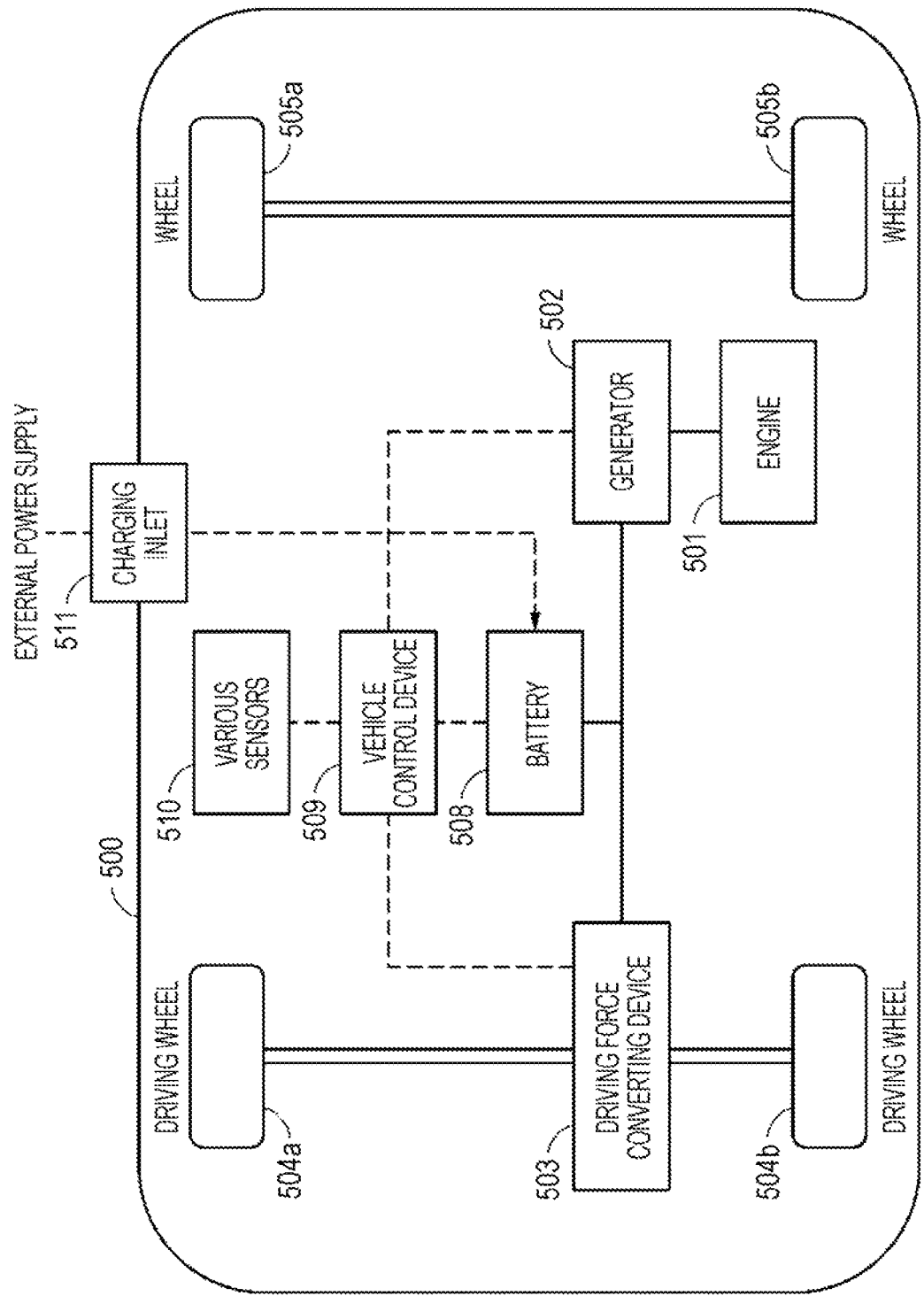
FIG. 9 is a schematic view illustrating a configuration example of an electrically driven vehicle according to still another embodiment of the present technology.

Description will be given of a configuration example of the electrically driven vehicle according to the sixth embodiment of the present technology with reference to FIG. 9. A hybrid car 500 is a hybrid car that employs a series hybrid system. The series hybrid system relates to a vehicle that uses electric power that is generated by a generator that is moved by an engine and electric power or the electric power that is stored at once in a battery, and travels with a power-driving force converting device 503.

In the hybrid car 500, an engine 501, a generator 502, a power-driving force converting device 503, a driving wheel 504a, a driving wheel 504b, a wheel 505a, a wheel 505b, a battery 508, a vehicle control device 509, various sensors 510, and a charging inlet 511 are mounted. As the battery 508, the battery according to the first embodiment or the second embodiment of the present technology is used.

The hybrid car 500 travels by using the power-driving force converting device 503 as a power source. An example of the power-driving force converting device 503 is a motor. The power-driving force converting device 503 operates by electric power of the battery 508, and the torque of the power-driving force converting device 503 is transmitted to the driving wheels 504a and 504b. In addition, the power-driving force converting device 503 is applicable to an AC motor or a DC motor by using DC-AC conversion or invert conversion (AC-DC conversion) at a necessary site. The various sensors 510 control the engine speed or the opening degree (throttle opening degree) of a throttle valve (not illustrated) through the vehicle control device 509. Examples of the various sensors 510 include a speed sensor, an acceleration sensor, an engine speed sensor, and the like.

The torque of the engine 501 can be transmitted to the generator 502, and electric power generated by the generator 502 using the torque can be stored in the battery 508.

When the hybrid car 500 is decelerated by a brake mechanism (not illustrated), a resistance force during the deceleration is added to the power-driving force converting device 503 as a torque, and regenerated electric power that is generated by the power-driving force converting device 503 due to the torque is stored in the battery 508.

When the battery 508 is connected to an external power supply on an outer side of the hybrid car 500 through the charging inlet 511, electric power can be supplied to the battery 508 from the external power supply by using the charging inlet 511 as an input inlet, and the battery 508 can store the electric power that is supplied.

Although not illustrated, an information processing device that performs information processing related to a vehicle control on the basis of information related to the battery may be provided. Examples of the information processing device include an information processing device that performs displaying of a residual amount of the battery on the basis of information about the residual amount of the battery, and the like.

In addition, hereinbefore, description has been given of the series hybrid car that travels with a motor by using electric power generated by a generator moved by an engine, or the electric power that is temporarily stored in a battery as an example. However, the present technology is effectively applicable to a parallel hybrid car that uses both the output of the engine and the output of the motor as driving sources, and utilizes three types of traveling using the engine only, traveling using the motor only, and traveling using the engine and motor by appropriately changing these types. In addition, the present technology is effectively applicable to a so-called electrically driven vehicle that travels using driving by a driving motor only without using the engine.

EXAMPLES

Hereinafter, the present technology will be described in detail with reference to examples. Furthermore, the present disclosure is not limited to configuration of the following examples.

(Fiber Diameter and Fiber Length of Carbon Fiber)

A fiber diameter and a fiber length of carbon fiber in the following examples and comparative examples represent average values obtained through calculation of measurement values obtained by measuring a fiber diameter and a fiber length of an arbitrary number of pieces of carbon fiber (20 pieces) by using an electron microscope (TEM or SEM). Furthermore, the fiber length is described as a numerical range such as a fiber length of equal to or greater than 1 µm and less than 10 µm, but it represents that the average value of the fiber length, which is calculated from the measurement values, is included in the range.

Example 1

(Preparation of Positive Electrode)

98 parts by mass of positive electrode active material ($LiCoO_2$), 1 part by mass of conductive agent (carbon black), and 1 part by mass of binding agent (polyvinylidene fluoride: PVdF) were mixed to prepare a positive electrode mixture. Continuously, the positive electrode mixture was dispersed in an organic solvent (N-methyl-2-pyrrolidone (NMP) to prepare paste-like positive electrode mixture slurry. Continuously, the positive electrode mixture slurry was applied to a positive electrode current collector (aluminum foil) by using a coating device and was dried to form a positive electrode active material layer. Finally, the positive electrode active material layer was compression-molded by using a press machine, thereby obtaining a positive electrode.

(Preparation of Negative Electrode)

A silicon oxide and graphite as a negative electrode active material, two kinds of carbon fiber (first carbon fiber and second carbon fiber), and PVdF as a binding agent were mixed, and the resultant mixture was diluted with NMP to prepare a paste-like negative electrode mixture slurry. Continuously, the negative electrode mixture slurry was applied to both surfaces of a negative electrode current collector (copper foil) by using a coating device and was dried to obtain a negative electrode.

Furthermore, the fiber diameter and the fiber length of the first carbon fiber and the second carbon fiber, and a mixing ratio of respective materials are as follows.

First carbon fiber:

Carbon fiber (specific surface area: 25 $m^2/g$) having the fiber diameter of 70 nm, the fiber length of equal to or greater than 1 µm and less than 10 µm Second carbon fiber:

Carbon fiber (specific surface area: 1325 $m^2/g$) having the fiber diameter of 150 nm, the fiber length of equal to or greater than 1 µm and less than 10 µm Mixing ratio (silicon oxide/graphite/first carbon fiber/second carbon fiber/binding agent)=10/81/1/2/6 (wt %)

(Preparation of Electrolytic Solution)

An electrolyte salt ($LiPF_6$) was dissolved in a solvent (ethylene carbonate and propylene carbonate) to prepare an electrolytic solution. Furthermore, a composition of the solvent was set to ethylene carbonate:propylene carbonate=50:50 in terms of % by mass, and the amount of the electrolyte salt was set to 1 mol/kg with respect to the solvent.

(Preparation of Evaluation Cell)

An evaluation cell was prepared as follows.

(Formation of Electrolyte Layer)

First, a precursor solution, which includes an electrolytic solution, a polymeric compound (PVdF) for electrolyte, and an organic solvent (NMP) as a solvent, was prepared. Next, the precursor solution was applied to the positive electrode and the negative electrode and was dried to form a gel-like electrolyte layer on both surfaces of each of the positive electrode and the negative electrode.

(Preparation of Wound Electrode Body)

Next, a lead was attached to each of a positive electrode current collector and a negative electrode current collector by using a welding method. Next, the positive electrode and the negative electrode, in which the electrolyte layer was formed, were laminated through a separator, and the resultant laminated body was wound. Then, a protective tape was stuck on an outermost peripheral portion of the resultant wound body. Accordingly, a wound electrode body was obtained.

(Assembly of Battery)

Next, the wound electrode body was interposed between two sheets of film-shaped exterior packaging members, and outer peripheral edges of the exterior packaging members were bonded to each other by using a thermal fusion method to seal the wound electrode body at the inside of the exterior packaging members. Accordingly, a target evaluation cell (laminated film type battery) was obtained.

Example 2

The second carbon fiber was changed to carbon fiber (specific surface area: 28 $m^2/g$) having the fiber diameter of 70 nm and the fiber length of equal to or greater than 10 µm and less than 50 µm. A target evaluation cell was obtained in a similar manner as in Example 1 except for the above-described configuration.

Example 3

The negative electrode active material was changed to silicon and graphite. A mixing ratio (silicon/graphite/first carbon fiber/second carbon fiber/binding agent) was set to 5/86/1/2/6 (wt %). A target evaluation cell was obtained in a similar manner as in Example 1 except for the above-described configuration.

Example 4

The negative electrode active material was changed to a silicon alloy and graphite. A mixing ratio (silicon alloy/graphite/first carbon fiber/second carbon fiber/binding agent) was set to 10/81/1/2/6 (wt %). A target evaluation cell was obtained in a similar manner as in Example 1 except for the above-described configuration.

Example 5

The negative electrode active material was changed to silicon. The binding agent was changed to polyamideimide. A mixing ratio (silicon/first carbon fiber/second carbon fiber/binding agent) was set to 89/1/2/8 (wt %). A target evaluation cell was obtained in a similar manner as in Example 1 except for the above-described configuration.

Example 6

The negative electrode active material was changed to a silicon oxide. The binding agent was changed to polyamideimide. A mixing ratio (silicon oxide/first carbon fiber/second carbon fiber/binding agent) was set to 89/1/2/8 (wt %). A target evaluation cell was obtained in a similar manner as in Example 1 except for the above-described configuration.

Example 7

The negative electrode active material was changed to a silicon alloy. The binding agent was changed to polyamideimide. A mixing ratio (silicon alloy/first carbon fiber/second carbon fiber/binding agent) was set to 89/1/2/8 (wt %). A target evaluation cell was obtained in a similar manner as in Example 1 except for the above-described configuration.

Comparative Example 1

Only the first carbon fiber was used without using the second carbon fiber. A mixing ratio (silicon oxide/graphite/first carbon fiber/binding agent) was set to 10/83/1/6 (wt %). A target evaluation cell was obtained in a similar manner as in Example 1 except for the above-described configuration.

Comparative Example 2

Carbon fiber (specific surface area: 250 $m^2/g$) having the fiber diameter of 20 nm and the fiber length of equal to or greater than 1 μm and less than 10 μm was used as another carbon fiber instead of the first carbon fiber. A mixing ratio (silicon oxide/graphite/another carbon fiber/binding agent) was set to 10/83/1/6 (wt %). A target evaluation cell was obtained in a similar manner as in Comparative Example 1 except for the above-described configuration.

Comparative Example 3

Carbon fiber (specific surface area: 13 $m^2/g$) having the fiber diameter of 150 nm and the fiber length of equal to or greater than 1 μm and less than 10 μm was used as the second carbon fiber instead of the first carbon fiber. A mixing ratio (silicon oxide/graphite/second carbon fiber/binding agent) was set to 10/83/1/6 (wt %). A target evaluation cell was obtained in a similar manner as in Comparative Example 1 except for the above-described configuration.

Comparative Example 4

Carbon fiber (specific surface area: 28 $m^2/g$) having the fiber diameter of 70 nm and the fiber length of equal to or greater than 10 μm and less than 50 μm was used as the second carbon fiber instead of the first carbon fiber. A mixing ratio (silicon oxide/graphite/second carbon fiber/binding agent) was set to 10/83/1/6 (wt %). A target evaluation cell was obtained in a similar manner as in Comparative Example 1 except for the above-described configuration.

Comparative Example 5

Carbon black (specific surface area: 50 $m^2/g$) having an average particle size of 40 nm was used as the conductive agent instead of the first carbon fiber. A mixing ratio (silicon oxide/graphite/carbon black/binding agent) was set to 10/83/1/6 (wt %). A target evaluation cell was obtained in a similar manner as in Comparative Example 1 except for the above-described configuration.

Comparative Example 6

A graphite-based conductive agent (specific surface area: 20 $m^2/g$) having an average particle size of 3 μm (3000 nm) was used as the conductive agent instead of the first carbon fiber. A mixing ratio (silicon oxide/graphite/graphite-based conductive agent/binding agent) was set to 10/83/1/6 (wt %). A target evaluation cell was obtained in a similar manner as in Comparative Example 1 except for the above-described configuration.

Comparative Example 7

Carbon black (specific surface area: 50 $m^2/g$) having an average particle size of 40 nm was used as the conductive agent instead of the second carbon fiber. A mixing ratio (silicon oxide/graphite/first carbon fiber/carbon black/binding agent) was set to 10/81/1/2/6 (wt %). A target evaluation cell was obtained in a similar manner as in Example 1 except for the above-described configuration.

Comparative Example 8

A graphite-based conductive agent (specific surface area: 20 $m^2/g$) having an average particle size of 3 μm (3000 nm) was used as the conductive agent instead of the second carbon fiber. A mixing ratio (silicon oxide/graphite/first carbon fiber/graphite-based conductive agent/binding agent) was set to 10/81/1/2/6 (wt %). A target evaluation cell was obtained in a similar manner as in Example 1 except for the above-described configuration.

Comparative Example 9

Carbon fiber (specific surface area: 13 $m^2/g$) having the fiber diameter of 150 nm and the fiber length of equal to or greater than 1 μm and less than 10 μm was used as the second carbon fiber instead of the first carbon fiber. That is, as the second carbon fiber, carbon fiber (first one thereof, specific surface area: 13 $m^2/g$) having the fiber diameter of 150 nm and the fiber length of equal to or greater than 1 μm and less than 10 μm, and carbon fiber (second one thereof, specific surface area: 28 $m^2/g$) having the fiber diameter of 70 nm and the fiber length of equal to or greater than 10 μm and less than 50 μm were used. A mixing ratio (silicon oxide/graphite/carbon fiber (first)/carbon fiber (second)/binding agent) was set to 10/81/1/2/6 (wt %). A target evaluation cell was obtained in a similar manner as in Example 1 except for the above-described configuration.

Comparative Example 10

The first carbon fiber and the second carbon fiber were not used. A mixing ratio (silicon oxide/graphite/PVdF) was set to 10/84/6 (wt %). A target evaluation cell was obtained in a similar manner as in Example 1 except for the above-described configuration.

Comparative Example 11

The negative electrode active material was changed to silicon and graphite. Only the first carbon fiber was used without using the second carbon fiber. A mixing ratio (silicon/graphite/first carbon fiber/binding agent) was set to 5/88/1/6 (wt %). A target evaluation cell was obtained in a similar manner as in Example 1 except for the above-described configuration.

Comparative Example 12

The negative electrode active material was changed to silicon and graphite. Only the second carbon fiber was used without using the first carbon fiber. A mixing ratio (silicon/graphite/second carbon fiber/binding agent) was set to 5/88/1/6 (wt %). A target evaluation cell was obtained in a similar manner as in Example 1 except for the above-described configuration.

Comparative Example 13

The negative electrode active material was changed to a silicon alloy and graphite. Only the first carbon fiber was used without using the second carbon fiber. A mixing ratio (silicon alloy/graphite/first carbon fiber/binding agent) was set to 10/83/1/6 (wt %). A target evaluation cell was obtained in a similar manner as in Example 1 except for the above-described configuration.

Comparative Example 14

The negative electrode active material was changed to a silicon alloy and graphite. Only the second carbon fiber was used without using the first carbon fiber. A mixing ratio (silicon alloy/graphite/second carbon fiber/binding agent) was set to 10/83/1/6 (wt %). A target evaluation cell was obtained in a similar manner as in Example 1 except for the above-described configuration.

Comparative Example 15

Only the first carbon fiber was used without using the second carbon fiber. A mixing ratio (silicon/first carbon fiber/binding agent) was set to 91/1/8 (wt %). A target evaluation cell was obtained in a similar manner as in Example 5 except for the above-described configuration.

Comparative Example 16

Only the second carbon fiber was used without using the first carbon fiber. A mixing ratio (silicon/second carbon fiber/binding agent) was set to 91/1/8 (wt %). A target evaluation cell was obtained in a similar manner as in Example 5 except for the above-described configuration.

Comparative Example 17

The negative electrode active material was changed to a silicon oxide. Only the first carbon fiber was used without using the second carbon fiber. A mixing ratio (silicon oxide/first carbon fiber/binding agent) was set to 91/1/8 (wt %). A target evaluation cell was obtained in a similar manner as in Example 5 except for the above-described configuration.

Comparative Example 18

The negative electrode active material was changed to a silicon oxide. Only the second carbon fiber was used without using the first carbon fiber. A mixing ratio (silicon oxide/second carbon fiber/binding agent) was set to 91/1/8 (wt %). A target evaluation cell was obtained in a similar manner as in Example 5 except for the above-described configuration.

Comparative Example 19

The negative electrode active material was changed to a silicon alloy. Only the first carbon fiber was used without using the second carbon fiber. A mixing ratio (silicon alloy/first carbon fiber/binding agent) was set to 91/1/8 (wt %). A target evaluation cell was obtained in a similar manner as in Example 5 except for the above-described configuration.

Comparative Example 20

The negative electrode active material was changed to a silicon alloy. Only the second carbon fiber was used without using the first carbon fiber. A mixing ratio (silicon alloy/second carbon fiber/binding agent) was set to 91/1/8 (wt %). A target evaluation cell was obtained in a similar manner as in Example 5 except for the above-described configuration.

(Evaluation)

The flowing measurement was performed by using the evaluation cells which were prepared.

(Measurement of Initial Efficiency)

Under an environment of 23°, charging was performed once with constant-current constant-voltage charging (conditions: a current of 0.2 C, and a charging termination voltage of 4.35 V), and then discharging was performed once with constant-current discharging (conditions: a current of 0.2 C, and a discharging termination voltage of 3.0 V) to measure charging capacity and discharging capacity. Then, initial efficiency was calculated from an expression of (discharging capacity/charging capacity)×100[%].

(Cycle Characteristic Evaluation)

A cycle test, in which under an environment of 23°, constant-current constant-voltage charging (conditions: a current of 0.5 C, and a charging termination voltage of 4.35 V), and constant-current discharging (conditions: a current of 0.5 C, and a discharging termination voltage of 3.0 V) are repeated, was performed to obtain discharging capacity retention rates at $10^{th}$ cycle, $100^{th}$ cycle, and $200^{th}$ cycle with respect to the discharging capacity at first cycle.

A configuration of the negative electrode is illustrated in Table 1, and measurement results are illustrated in Table 2.

TABLE 1

| | Negative electrode active material | | | | Carbon fiber | | | | | | | |
| | | | | | First carbon fiber | | | | Second carbon fiber | | | |
| | Silicon oxide [wt %] | Silicon [wt %] | Silicon alloy [wt %] | Graphite [wt %] | Fiber diameter [nm] | Fiber length [µm] | Specific surface area [m²/g] | Amount [wt %] | Fiber diameter [nm] | Fiber length [µm] | Specific surface area [m²/g] | Amount [wt %] |
|---|---|---|---|---|---|---|---|---|---|---|---|---|
| Example 1 | 10 | — | — | 81 | 70 | 1-10 | 25 | 1 | 150 | 1-10 | 13 | 2 |
| Example 2 | 10 | — | — | 81 | 70 | 1-10 | 25 | 1 | 70 | 10-50 | 28 | 2 |
| Example 3 | — | 5 | — | 86 | 70 | 1-10 | 25 | 1 | 150 | 1-10 | 13 | 2 |
| Example 4 | — | — | 10 | 81 | 70 | 1-10 | 25 | 1 | 150 | 1-10 | 13 | 2 |
| Example 5 | — | 89 | — | — | 70 | 1-10 | 25 | 1 | 150 | 1-10 | 13 | 2 |
| Example 6 | 89 | — | — | — | 70 | 1-10 | 25 | 1 | 150 | 1-10 | 13 | 2 |
| Example 7 | — | — | 89 | — | 70 | 1-10 | 25 | 1 | 150 | 1-10 | 13 | 2 |
| Comparative Example 1 | 10 | — | — | 83 | 70 | 1-10 | 25 | 1 | — | — | — | — |
| Comparative Example 2 | 10 | — | — | 83 | — | — | — | — | — | — | — | — |
| Comparative Example 3 | 10 | — | — | 83 | — | — | — | — | 150 | 1-10 | 13 | 1 |

TABLE 1-continued

| | | | | | | | | | | | | |
|---|---|---|---|---|---|---|---|---|---|---|---|---|
| Comparative Example 4 | 10 | — | — | 83 | — | — | — | — | 70 | 10-50 | 28 | 1 |
| Comparative Example 5 | 10 | — | — | 83 | — | — | — | — | — | — | — | — |
| Comparative Example 6 | 10 | — | — | 83 | — | — | — | — | — | — | — | — |
| Comparative Example 7 | 10 | — | — | 81 | 70 | 1-10 | 25 | 1 | — | — | — | — |
| Comparative Example 8 | 10 | — | — | 81 | 70 | 1-10 | 25 | 1 | — | — | — | — |
| Comparative Example 9 | 10 | — | — | 81 | — | — | — | — | 150 | 1-10 | 13 | 1 |
| Comparative Example 10 | 10 | — | — | 84 | — | — | — | — | 70 | 10-50 | 28 | 2 |
| Comparative Example 11 | — | 5 | — | 88 | 70 | 1-10 | 25 | 1 | — | — | — | — |
| Comparative Example 12 | — | 5 | — | 88 | — | — | — | — | 150 | 1-10 | 13 | 1 |
| Comparative Example 13 | — | — | 10 | 83 | 70 | 1-10 | 25 | 1 | — | — | — | — |
| Comparative Example 14 | — | — | 10 | 83 | — | — | — | 1 | 150 | 1-10 | 13 | 1 |
| Comparative Example 15 | — | 91 | — | — | 70 | 1-10 | 25 | 1 | — | — | — | — |
| Comparative Example 16 | — | 91 | — | — | — | — | — | — | 150 | 1-10 | 13 | 1 |
| Comparative Example 17 | 91 | — | — | — | 70 | 1-10 | 25 | 1 | — | — | — | — |
| Comparative Example 18 | 91 | — | — | — | — | — | — | — | 150 | 1-10 | 13 | 1 |
| Comparative Example 19 | — | — | 91 | — | 70 | 1-10 | 25 | 1 | — | — | — | — |
| Comparative Example 20 | — | — | 91 | — | — | — | — | — | 150 | 1-10 | 13 | 1 |

| | Carbon fiber Another carbon fiber | | | | Conductive agent | | | Binding agent | |
|---|---|---|---|---|---|---|---|---|---|
| | Fiber diameter [nm] | Fiber length [μm] | Specific surface area [m²/g] | Amount [wt %] | Particle size [nm] | Specific surface area [m²/g] | Amount [wt %] | PVdF [wt %] | Polyamideimide [wt %] |
| Example 1 | — | — | — | — | — | — | — | 6 | — |
| Example 2 | — | — | — | — | — | — | — | 6 | — |
| Example 3 | — | — | — | — | — | — | — | 6 | — |
| Example 4 | — | — | — | — | — | — | — | 6 | — |
| Example 5 | — | — | — | — | — | — | — | — | 8 |
| Example 6 | — | — | — | — | — | — | — | — | 8 |
| Example 7 | — | — | — | — | — | — | — | — | 8 |
| Comparative Example 1 | — | — | — | — | — | — | — | 6 | — |
| Comparative Example 2 | 20 | 1-10 | 250 | 1 | — | — | — | 6 | — |
| Comparative Example 3 | — | — | — | — | — | — | — | 6 | — |
| Comparative Example 4 | — | — | — | — | — | — | — | 6 | — |
| Comparative Example 5 | — | — | — | — | 40 | 50 | 1 | 6 | — |
| Comparative Example 6 | — | — | — | — | 3000 | 20 | 1 | 6 | — |
| Comparative Example 7 | — | — | — | — | 40 | 50 | 2 | 6 | — |
| Comparative Example 8 | — | — | — | — | 3000 | 20 | 2 | 6 | — |
| Comparative Example 9 | — | — | — | — | — | — | — | 6 | — |
| Comparative Example 10 | — | — | — | — | — | — | — | 6 | — |
| Comparative Example 11 | — | — | — | — | — | — | — | 6 | — |
| Comparative Example 12 | — | — | — | — | — | — | — | 6 | — |
| Comparative Example 13 | — | — | — | — | — | — | — | 6 | — |
| Comparative Example 14 | — | — | — | — | — | — | — | 6 | — |
| Comparative Example 15 | — | — | — | — | — | — | — | — | 8 |
| Comparative Example 16 | — | — | — | — | — | — | — | — | 8 |
| Comparative Example 17 | — | — | — | — | — | — | — | — | 8 |
| Comparative Example 18 | — | — | — | — | — | — | — | — | 8 |
| Comparative Example 19 | — | — | — | — | — | — | — | — | 8 |
| Comparative Example 20 | — | — | — | — | — | — | — | — | 8 |

Fiber length: 1 to 10 [μm] = equal to or greater than 1 μm to less than 10 μm
Fiber length: 10 to 50 [μm] = equal to or greater than 10 μm to less than 50 μm

TABLE 2

| | Initial efficiency [%] | Discharging capacity retention rate [%] | | |
|---|---|---|---|---|
| | | 10th cycle | 100th cycle | 200th cycle |
| Example 1 | 85.7 | 97.1 | 86.0 | 77.3 |
| Example 2 | 85.2 | 97.3 | 86.3 | 77.2 |
| Example 3 | 87.9 | 92.1 | 77.8 | 62.1 |
| Example 4 | 86.4 | 97.8 | 85.5 | 74.4 |
| Example 5 | 84.1 | 80.0 | 61.0 | 50.5 |
| Example 6 | 70.2 | 89.9 | 74.2 | 62.5 |
| Example 7 | 80.1 | 92.5 | 74.4 | 60.2 |
| Comparative Example 1 | 85.6 | 97.1 | 86.3 | 72.1 |
| Comparative Example 2 | 82.3 | 97.2 | 83.8 | 70.8 |
| Comparative Example 3 | 85.8 | 94.0 | 84.0 | 74.3 |
| Comparative Example 4 | 85.7 | 94.7 | 84.4 | 74.4 |
| Comparative Example 5 | 84.6 | 94.1 | 80.1 | 70.9 |
| Comparative Example 6 | 85.6 | 93.8 | 79.9 | 71.0 |
| Comparative Example 7 | 84.5 | 97.0 | 85.5 | 71.9 |
| Comparative Example 8 | 85.6 | 97.1 | 85.6 | 72.2 |
| Comparative Example 9 | 85.5 | 94.2 | 84.4 | 73.9 |

TABLE 2-continued

|  | Initial efficiency [%] | Discharging capacity retention rate [%] | | |
| --- | --- | --- | --- | --- |
|  |  | $10^{th}$ cycle | $100^{th}$ cycle | $200^{th}$ cycle |
| Comparative Example 10 | 85.5 | 93.6 | 79.8 | 71.0 |
| Comparative Example 11 | 87.8 | 91.6 | 70.6 | 51.2 |
| Comparative Example 12 | 88.0 | 85.6 | 62.9 | 41.6 |
| Comparative Example 13 | 86.3 | 96.9 | 83.4 | 70.8 |
| Comparative Example 14 | 86.3 | 94.2 | 81.5 | 69.8 |
| Comparative Example 15 | 84.0 | 78.9 | 50.6 | 28.6 |
| Comparative Example 16 | 84.2 | 70.5 | 43.7 | 27.6 |
| Comparative Example 17 | 69.9 | 88.5 | 70.8 | 55.2 |
| Comparative Example 18 | 70.1 | 84.1 | 65.7 | 51.2 |
| Comparative Example 19 | 80.2 | 92.9 | 68.8 | 50.8 |
| Comparative Example 20 | 80.3 | 89.1 | 61.9 | 46.6 |

From the measurement results, the initial efficiency tended to decrease in Comparative Example 2, Comparative Example 5, and Comparative Example 7. The reason for this is as follows. Since the specific surface area of the carbon fiber or the conductive agent is great, a negative electrode reaction area increases in charging, and a large amount of reversible Li is lost when forming a film. Accordingly, it is preferable that the specific surface area of the carbon fiber and the conductive agent is suppressed to be less than 50 $m^2/g$ from the viewpoint of the initial efficiency.

With regard to the discharging capacity retention rate for every cycles, first, at the point of time at $10^{th}$ cycle as an initial period, Examples 1 to 7, Comparative Examples 1 and 2, Comparative Examples 7 and 8, Comparative Example 11, Comparative Example 13, Comparative Example 15, Comparative Example 17, and Comparative Example 19 were satisfactory.

In the examples and the comparative examples, first carbon fiber or another fiber, which has the fiber diameter of less than 150 nm, and the fiber length of equal to or greater than 1 μm and less than 10 μm, was used. The reason for the measurement results is as follows. The first carbon fiber having a small diameter and a short length is likely to be adsorbed to a particle surface of silicon or a compound thereof, and thus it is possible to secure an electron path on the particle surface and in the vicinity thereof, and it is possible to suppress collapse of the electron path on the particle surface and in the vicinity thereof in conformity to expansion and shrinkage of the silicon and the compound thereof along with a cycle.

Next, although exhibiting an improvement at the point of time of the $10^{th}$ cycle, only Comparative Example 2 exhibited a deterioration tendency when comparing measurement results obtained at the point of time of the $100^{th}$ cycle as an intermediate cycle period. The reason for this is as follows. Since the other carbon fiber having a fiber diameter as very small as 20 nm was used, when a distance between particles becomes wider due to expansion and shrinkage of the active material along with the progress of cycles, and a contact failure occurs, it is difficult to maintain the electron path. In addition, in a case where the fiber diameter of the carbon fiber becomes smaller, a specific surface area increases, and the initial efficiency decreases, and thus this case is not preferable. Accordingly, it could be seen that it is preferable to use the first carbon fiber having an average fiber diameter of equal to or greater than 70 nm and less than 150 nm, and a fiber length of equal to or greater than 1 μm and less than 10 μm.

Finally, at the point of time of the $200^{th}$ cycle as a long-term cycle, Example 1 to Example 7 exhibited high discharging capacity retention rate. The reason for this is as follows. In a case where the cycle further progresses, a distance between particles becomes further wider, and thus the second carbon fiber having a large diameter and a long length can contribute to a long-distance electron path.

From the results, it could be confirmed that it is optimal to use the first carbon fiber having the fiber diameter of equal to or greater than 70 nm and less than 150 nm and the fiber length of equal to or greater than 1 μm and less than 10 μm, and the second carbon fiber having the fiber diameter of 150 nm or greater or the fiber length of 10 μm or greater.

7. Other Embodiments (Modification Examples)

Hereinbefore, the present technology has been described with reference to the embodiments and examples. However, the present technology is not limited thereto, and various modifications can be made in a range of the gist of the present technology.

The dimensions, the structures, the shapes, the materials, the raw materials, the manufacturing processes, and the like, which are exemplified in the above-described embodiments and examples, are illustrative only, and other dimensions, structures, shapes, materials, raw materials, manufacturing processes, and the like, which are different from those which are exemplified, may be used as necessary.

In addition, the configurations, the methods, the processes, the shapes, the materials, the dimensions, and the like of the above-described embodiments and examples may be combined with each other in a range not departing from the gist of the present technology.

The negative electrode according to the present technology is also applicable to a case where the negative electrode has another battery structure such as a square shape, similarly. In the first and second embodiments, a laminated electrode body may be used instead of the wound electrode body. For example, the negative electrode according to the present technology is also applicable to a flexible battery and the like which are mounted on a wearable terminal such as a smart watch, a head-mounted display, and iGlass (registered trademark). The negative electrode according to the present technology is also applicable to a battery that is mounted, for example, on a flying object such as an aircraft and a pilotless plane.

The present technology can employ the following configurations.

A negative electrode, including:
a negative electrode active material; and
first carbon fiber and second carbon fiber,
in which the first carbon fiber has a fiber diameter of equal to or greater than 70 nm and less than 150 nm, and a fiber length of equal to or greater than 1 μm and less than 10 μm, and
the second carbon fiber has a fiber diameter of 150 nm or greater or a fiber length of 10 μm or greater.

The negative electrode according to [1],
in which the negative electrode active material includes at least one of a noncarbon material and a carbon material.

The negative electrode according to [2],
in which the noncarbon material includes at least one of a silicon-containing material and a tin-containing material, and
the carbon material includes graphite.

The negative electrode according to [3],
in which the silicon-containing material includes at least one of elementary silicon, a silicon alloy, and a silicon compound, and
the tin-containing material includes at least one of an elementary tin, a tin alloy, and a tin compound.

The negative electrode according to any one of [1] to [4],
in which a specific surface area of the first carbon fiber is less than 50 m$^2$/g, and
a specific surface area of the second carbon fiber is less than 50 m$^2$/g.

The negative electrode according to any one of [1] to [5],
in which a total mass of the first carbon fiber and the second carbon fiber is equal to or greater than 0.1 wt % and less than 10 wt % with respect to the total mass of a negative electrode constituent material.

A battery, including:
a positive electrode;
a negative electrode; and
an electrolyte,
in which the negative electrode includes a negative electrode active material, first carbon fiber, and second carbon fiber,
the first carbon fiber has a fiber diameter of equal to or greater than 70 nm and less than 150 nm, and a fiber length of equal to or greater than 1 μm and less than 10 μm, and
the second carbon fiber has a fiber diameter of 150 nm or greater or a fiber length of 10 μm or greater.

A battery pack, including:
the battery according to [7]; and
a control unit that controls the battery.

An electronic apparatus,
in which electric power is supplied from the battery according to [7].

An electrically driven vehicle, including:
the battery according to [7];
a conversion device to which electric power is supplied from the battery and which converts the electric power into a driving force of a vehicle; and
a control device which performs information processing related to a vehicle control on the basis of information about the battery.

An electrical storage device, including:
the battery according to [7],
in which the electrical storage device supplies electric power to an electronic apparatus that is connected to the battery.

The electrical storage device according to [11], further including:
an electric power information control device that transmits and receives a signal to and from other apparatuses via a network,
in which a charging and discharging control of the battery is performed on the basis of information that is received by the electric power information control device.

An electric power system,
in which electric power is supplied from the battery according to [7].

The electric power system according to [13],
in which the electric power is supplied to the battery from a power generator or a power network.

REFERENCE SIGNS LIST

11 Battery casing
12, 13 Insulating plate
14 Battery lid
15A Disc plate
15 Safety valve mechanism
16 Positive temperature coefficient element
17 Gasket
20 Wound electrode body
21 Positive electrode
21A Positive electrode current collector
21B Positive electrode active material layer
22 Negative electrode
22A Negative electrode current collector
22B Negative electrode active material layer
23 Separator
24 Center pin
25 Positive electrode lead
26 Negative electrode lead
30 Wound electrode body
31 Positive electrode lead
32 Negative electrode lead
33 Positive electrode
34 Negative electrode
35 Separator
36 Electrolyte layer
111 Battery cell (power supply)
121 Control unit
200 Battery pack
201 Assembled battery
201a Secondary battery
300 Electronic apparatus
400 Electrical storage system
403 Electrical storage device
404 Power generator
406 Electrically driven vehicle
409 Power network
410 Control device
412 Information network
503 Power-driving force converting device
508 Battery
509 Vehicle control device

The invention claimed is:
1. A negative electrode, comprising:
a negative electrode active material; and
first carbon fiber and second carbon fiber, wherein
the first carbon fiber has a fiber diameter of equal to or greater than 70 nm and less than 150 nm, and a fiber length of equal to or greater than 1 μm and less than 10 μm,
the second carbon fiber has a fiber diameter of 150 nm or greater or a fiber length of 10 μm or greater,
the negative electrode active material includes a noncarbon material and a carbon material,
the noncarbon material includes a silicon-containing material and a tin-containing material,
the tin-containing material comprises tin and magnesium,
the carbon material includes graphite, and
a total mass of the noncarbon material is equal to or greater than 5 wt. % and less than 10 wt. % with respect to a total mass of negative electrode constituent material.

2. The negative electrode according to claim 1, wherein
the silicon-containing material includes at least one of
elementary silicon, a silicon alloy, and a silicon compound, and
the tin-containing material includes at least one of a tin alloy and a tin compound.

3. The negative electrode according to claim 1, wherein
a specific surface area of the first carbon fiber is less than 50 m$^2$/g, and
a specific surface area of the second carbon fiber is less than 50 m$^2$/g.

4. The negative electrode according to claim 1, wherein a total mass of the first carbon fiber and the second carbon fiber is equal to or greater than 0.1 wt % and less than 10 wt % with respect to the total mass of negative electrode constituent material.

5. A battery, comprising:
a positive electrode;
a negative electrode; and
an electrolyte, wherein
the negative electrode includes a negative electrode active material, first carbon fiber, and second carbon fiber,
the first carbon fiber has a fiber diameter of equal to or greater than 70 nm and less than 150 nm, and a fiber length of equal to or greater than 1 μm and less than 10 μm,
the second carbon fiber has a fiber diameter of 150 nm or greater or a fiber length of 10 μm or greater,
the negative electrode active material includes a noncarbon material and a carbon material,
the noncarbon material includes a silicon-containing material and a tin-containing material,
the tin-containing material comprises tin and magnesium,
the carbon material includes graphite, and
a total mass of the noncarbon material is equal to or greater than 5 wt. % and less than 10 wt. % with respect to a total mass of negative electrode constituent material.

6. A battery pack, comprising:
a battery that includes:
a positive electrode;
a negative electrode; and
an electrolyte, wherein
the negative electrode includes a negative electrode active material, first carbon fiber, and second carbon fiber,
the first carbon fiber has a fiber diameter of equal to or greater than 70 nm and less than 150 nm, and a fiber length of equal to or greater than 1 μm and less than 10 μm,
the second carbon fiber has a fiber diameter of 150 nm or greater or a fiber length of 10 μm or greater,
the negative electrode active material includes a noncarbon material and a carbon material,
the noncarbon material includes a silicon-containing material and a tin-containing material,
the tin-containing material comprises tin and magnesium,
the carbon material includes graphite, and
a total mass of the noncarbon material is equal to or greater than 5 wt. % and less than 10 wt. % with respect to a total mass of negative electrode constituent material; and
a control unit configured to control the battery.

7. An electronic apparatus, comprising:
a battery that includes:
a positive electrode;
a negative electrode; and
an electrolyte, wherein
the negative electrode includes a negative electrode active material, first carbon fiber, and second carbon fiber,
the first carbon fiber has a fiber diameter of equal to or greater than 70 nm and less than 150 nm, and a fiber length of equal to or greater than 1 μm and less than 10 μm,
the second carbon fiber has a fiber diameter of 150 nm or greater or a fiber length of 10 μm or greater,
the negative electrode active material includes a noncarbon material and a carbon material,
the noncarbon material includes a silicon-containing material and a tin-containing material,
the tin-containing material comprises tin and magnesium,
the carbon material includes graphite,
a total mass of the noncarbon material is equal to or greater than 5 wt. % and less than 10 wt. % with respect to a total mass of negative electrode constituent material, and
electric power is supplied from the battery.

8. An electrically driven vehicle, comprising:
a battery that includes:
a positive electrode;
a negative electrode; and
an electrolyte, wherein
the negative electrode includes a negative electrode active material, first carbon fiber, and second carbon fiber,
the first carbon fiber has a fiber diameter of equal to or greater than 70 nm and less than 150 nm, and a fiber length of equal to or greater than 1 μm and less than 10 μm,
the second carbon fiber has a fiber diameter of 150 nm or greater or a fiber length of 10 μm or greater,
the negative electrode active material includes a noncarbon material and a carbon material,
the noncarbon material includes a silicon-containing material and a tin-containing material,
the tin-containing material comprises tin and magnesium,
the carbon material includes graphite, and
a total mass of the noncarbon material is equal to or greater than 5 wt. % and less than 10 wt. % with respect to a total mass of negative electrode constituent material;
a conversion device configured to:
receive electric power from the battery; and
convert the electric power into a driving force of the electrically driven vehicle; and
a control device configured to process information related to control of the electrically driven vehicle, on a basis of information about the battery.

9. An electrical storage device, comprising:
a battery that includes:
a positive electrode;
a negative electrode; and
an electrolyte, wherein
the negative electrode includes a negative electrode active material, first carbon fiber, and second carbon fiber, the first carbon fiber has a fiber diameter of equal to or greater than 70 nm and less than 150 nm, and a fiber length of equal to or greater than 1 μm and less than 10 μm, the second carbon fiber has a fiber diameter of 150 nm or greater or a fiber length of 10 μm or greater, the negative electrode active material includes a noncarbon material and a carbon material, the noncarbon material includes a silicon-containing material and a tin-containing material, the tin-containing material comprises tin and magnesium, the carbon material includes graphite, a total mass of the noncarbon material is equal to or greater than 5 wt. % and less than 10 wt. % with respect to a total mass of negative electrode constituent material, and the electrical storage device is configured to supply electric power to an electronic apparatus that is connected to the battery.

10. The electrical storage device according to claim 9, further comprising an electric power information control device configured to transmit and receive a signal to and from other apparatuses via a network, wherein a charging and discharging control of the battery is executed on a basis of the signal received by the electric power information control device.

11. An electric power system, comprising:
a battery that includes:
  a positive electrode;
  a negative electrode; and
  an electrolyte, wherein
    the negative electrode includes a negative electrode active material, first carbon fiber, and second carbon fiber,
    the first carbon fiber has a fiber diameter of equal to or greater than 70 nm and less than 150 nm, and a fiber length of equal to or greater than 1 μm and less than 10 μm,
    the second carbon fiber has a fiber diameter of 150 nm or greater or a fiber length of 10 μm or greater,
    the negative electrode active material includes a noncarbon material and a carbon material,
    the noncarbon material includes a silicon-containing material and a tin-containing material,
    the tin-containing material comprises tin and magnesium,
    the carbon material includes graphite,
    a total mass of the noncarbon material is equal to or greater than 5 wt. % and less than 10 wt. % with respect to a total mass of negative electrode constituent material, and
    first electric power is supplied from the battery.

12. The electric power system according to claim 11, wherein the battery is further configured to receive second electric power from one of a power generator or a power network.

* * * * *